(12) United States Patent
Hood et al.

(10) Patent No.: US 6,986,855 B1
(45) Date of Patent: Jan. 17, 2006

(54) STRUCTURAL AND OPTICAL APPLICATIONS FOR SHAPE MEMORY POLYMERS (SMP)

(75) Inventors: Patrick J. Hood, Bellbrook, OH (US); David Ernest Havens, Bellbrook, OH (US)

(73) Assignee: Cornerstone Research Group, Dayton, OH (US)

( * ) Notice: Subject to any disclaimer, the term of this patent is extended or adjusted under 35 U.S.C. 154(b) by 347 days.

(21) Appl. No.: 10/056,182

(22) Filed: Jan. 24, 2002

Related U.S. Application Data

(60) Provisional application No. 60/263,986, filed on Jan. 24, 2001.

(51) Int. Cl.
*B29C 33/40* (2006.01)

(52) U.S. Cl. .............. 264/219; 264/101; 264/230; 264/334; 425/440

(58) Field of Classification Search .............. 264/219, 264/230, 101, 334; 425/440
See application file for complete search history.

(56) References Cited

U.S. PATENT DOCUMENTS

| | | |
|---|---|---|
| 3,453,247 A | 7/1969 | Satori et al. |
| 3,557,072 A | 1/1971 | Vergne et al. |
| 3,684,672 A | 8/1972 | Longi et al. |
| 4,110,396 A * | 8/1978 | Reynolds ............ 264/236 |
| 4,136,248 A | 1/1979 | Tenney |
| 4,178,424 A | 12/1979 | Tenney et al. |
| 4,193,899 A | 3/1980 | Brenner et al. |
| 4,203,884 A | 5/1980 | Coran et al. |
| 4,250,063 A | 2/1981 | Kotani et al. |
| 4,262,103 A | 4/1981 | Minchak |
| 4,553,936 A * | 11/1985 | Wang ................ 433/37 |
| 4,675,061 A * | 6/1987 | Mead ................ 156/155 |
| 4,831,094 A | 5/1989 | Stein et al. |
| 4,950,258 A * | 8/1990 | Kawai et al. ........ 604/530 |
| 5,013,507 A * | 5/1991 | Julien et al. ........ 264/219 |
| 5,057,252 A * | 10/1991 | Kagawa et al. ...... 264/416 |
| 5,098,776 A | 3/1992 | Kobayashi et al. |
| 5,189,110 A | 2/1993 | Ikematu et al. |
| 5,478,235 A * | 12/1995 | Schuldt et al. ...... 433/37 |
| 5,861,114 A | 1/1999 | Roffman et al. |
| 5,880,896 A | 3/1999 | Ishii et al. |
| 6,083,442 A * | 7/2000 | Gabilly ............. 264/163 |
| 6,086,204 A | 7/2000 | Magnante |
| 6,102,933 A | 8/2000 | Lee et al. |
| 6,113,817 A | 9/2000 | Herbrechtsmeier et al. |
| 6,705,585 B1 * | 3/2004 | Roy ................. 251/11 |

OTHER PUBLICATIONS

Toshisada Takahashi, Noriya Hayashi and Shunichi Hayashi; *Structure and Properties of Shape-Memory Polyurethane Block Copolymers*; Journal of Applied Polymer Science; 1996; pp. 1061-1069; vol. 60; John Wiley & Sons, Inc.

(Continued)

*Primary Examiner*—Allan R. Kuhns
(74) *Attorney, Agent, or Firm*—Wegman Hessler & Vanderburg

(57) ABSTRACT

The methods of manufacturing molds from shape memory materials and molds made thereby, in accordance with the present invention, provide numerous advantages for molding castable composite parts. The initial mold cost is low enough to accommodate economical production of as few as a single part incorporating high surface definition and intricate three dimensional detail. The preferred methods and molds made thereby are transparent, thereby, curing of the corresponding part by ultra-violet and infra-red light is made possible, as well as, visual inspection during injection and curing of the given resin. Removal of the cured part from within the mold is simplified.

24 Claims, 12 Drawing Sheets

OTHER PUBLICATIONS

Byung Kyu Kim, Sang Yup Lee and Mao Xu; *Polyurethanes Having Shape Memory Effects; Polymer*; pp. 5781-5793; vol. 37, No. 26; Elsevier Science Ltd.; GB.

Fengkui Li, Xian Zhang, Jianan Hou, Mao Xu, Xiaolie Luo, Dezhu Ma and Byung Kyu Kim; *Studies on Thermally Stimulated Shape Memory Effect of Segmented Polyurethanes; Journal of Applied Polymer Science*; 1997; pp. 1511-1516; vol. 64; John Wiley & Sons, Inc.

Viera Skákalová, Vladimir Lukš and Martin Breza; *Shape Memory Effect of Dehydrochlorinated Crosslinked Poly (Vinyl Chloride)*; Macromol. Chem. Phys.2; vol. 198; Hüthig & Wepf Verlag, Zug.

J. R. Lin and L. W. Chen; *Study on Shape-Memory Behavior of Polyether-Based Polyurethanes. I. Influence of the Hard-Segmenet Content; Journal of Applied Polymer Science*; 1998; pp. 1563-1574; vol. 69; John Wiley & Sons, Inc.

M. A. Rodríguez-Pérez, S. Díez-Gutiérrez and J. A. De Saja; *The Recovery Behavior of Crosslinked Closed Cell Polyolefin Foams; Polymer Engineering and Science*; May 1998; pp. 831-837; vol. 38, No. 5

Yoshihara Kagami, Jian Ping Gong and Yoshihito Osada; *Shape Memory Behaviors of Crosslinked Copolymers containing stearyl acrylate; Macromol. Rapid Commun*; 1996; pp. 539-543; vol. 17; Hüthig & Wepf Verlag, Zug.

R. A. Mantz, P. F. Jones, K. P. Chaffee, J. D. Lichtenham and J. W. Gilman; *Thermolysis of Polyhedral Oligomeric Silsequioxane (Poss) Macromers and Poss-Siloxane Copolymers*; Chem. Mater.; 1996; pp. 1250-1259; vol. 8; American Chemical Society.

Piyada Charoensirisomboon, Hiromu Saito, Takashi Inoue, Yoshiyuki Oishi and Kunio Mori; *Polysulfide Containing S-Triazine Rings as a New Thermoplastic Elastomer: Spherulite Morphology and Strain Recovery Behaviour; Polymer*; 1998; pp. 2089-2093; vol. 39, No. 11; Elsevier Science Ltd., GB.

M. P. Bogdanov, S. A. Dimakov, A. V. Gorlanov, D. A. Goryachkin, A.M. Grigor'ev, V. M. Irtuganov, V. P. Kalinen, I. M. Kliment'ev, I. M. Kozlovskaya, I. B Orlova, V. E. Sherstobitov and V. Yu. Venediktov; *Correction of Segmented Mirror Aberrations by Phase Conjugation and Dynamic Holography; Optic Communications*; 1996; pp. 405-413; vol. 129; Elsevier Science B.V.

Byung Kyu Kim, Sang Yup Lee, Jeong Sam Lee, Sang Hyun Baek, Young Jin Choi, Jang OO Lee and Mao Xu; *Polyurethane Ionomers Having Shape Memory Effects; Polymer*; 1998; pp. 2803-2808; vol. 39, No. 13; Elsevier Science Ltd.; GB.

T. S. Haddad, E. Choe and J. D. Lichtenhan; *Hybrid Styryl-Based Polyhedral Oligomeric Silsesquioxane (Poss) Polymers; Mat. Res. Soc. Symp. Proc.*; 1996; pp. 25-33; vol. 435; Materials Research Society.

*Engineered Material Handbook*; vol. 3: Adhesives and Sealants; 1999; pp. 316-318; 2nd Ed., ASM Internatin; US.

Malkin, Askadsky, Kovrigaand Chalykh; *Experimental Methods of Polymer Physics*; 1983; pp. 38-41; Prentice-Hall; Englewood Cliffs, NJ; US.

E. Hecht; *Optics, 2nd Ed.*; 1990; p. 351; Addison-Wesley; Reading MA; US.

Richard F. Gordon; *Applications of Shape Memory Polyurethanes; Proceedings of First Intn'l. Conference on Shape Memory and Superelastic Technologies*; 1994; pp. 115-120.

H. Tobushi, S. Hayashi and P. H. Lin; *Deformation Properties of Polyurethane Shape Memory Polymers*; Proceedings of the First Intn'l. Conference on Shape Memory and Superelastic Technologies; 1994; pp. 109-114.

*Shape Memory Polymers That Resist Creep Better; High-Tech Materials Alert*; Jun. 2, 2000; John Wiley & Sons, Inc.; US.

* cited by examiner

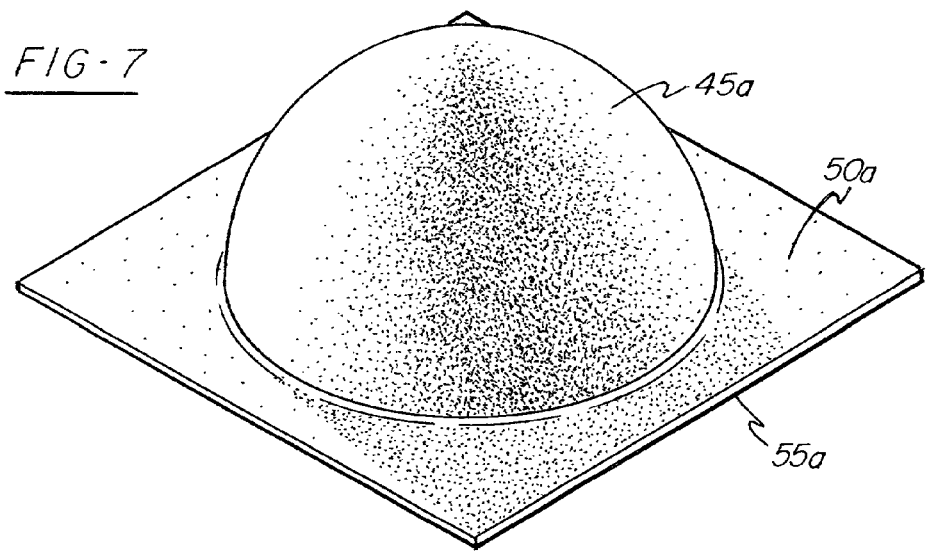
FIG-7
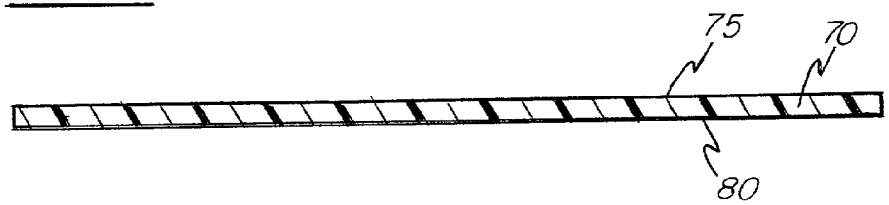
FIG-8
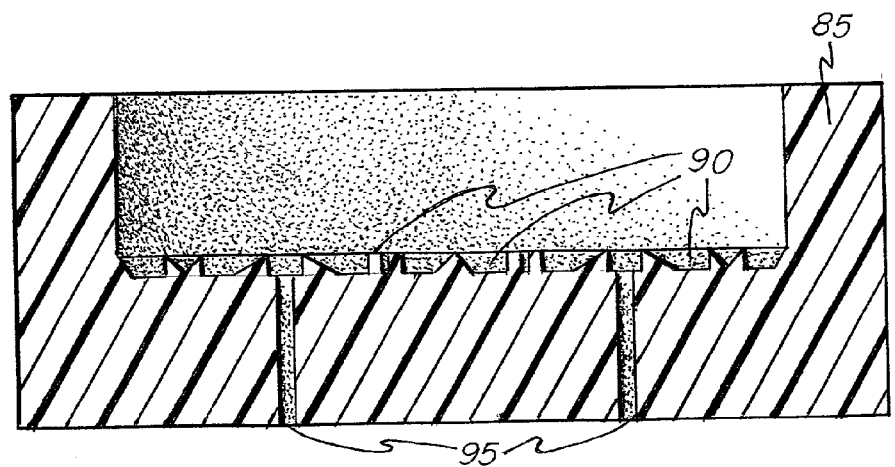

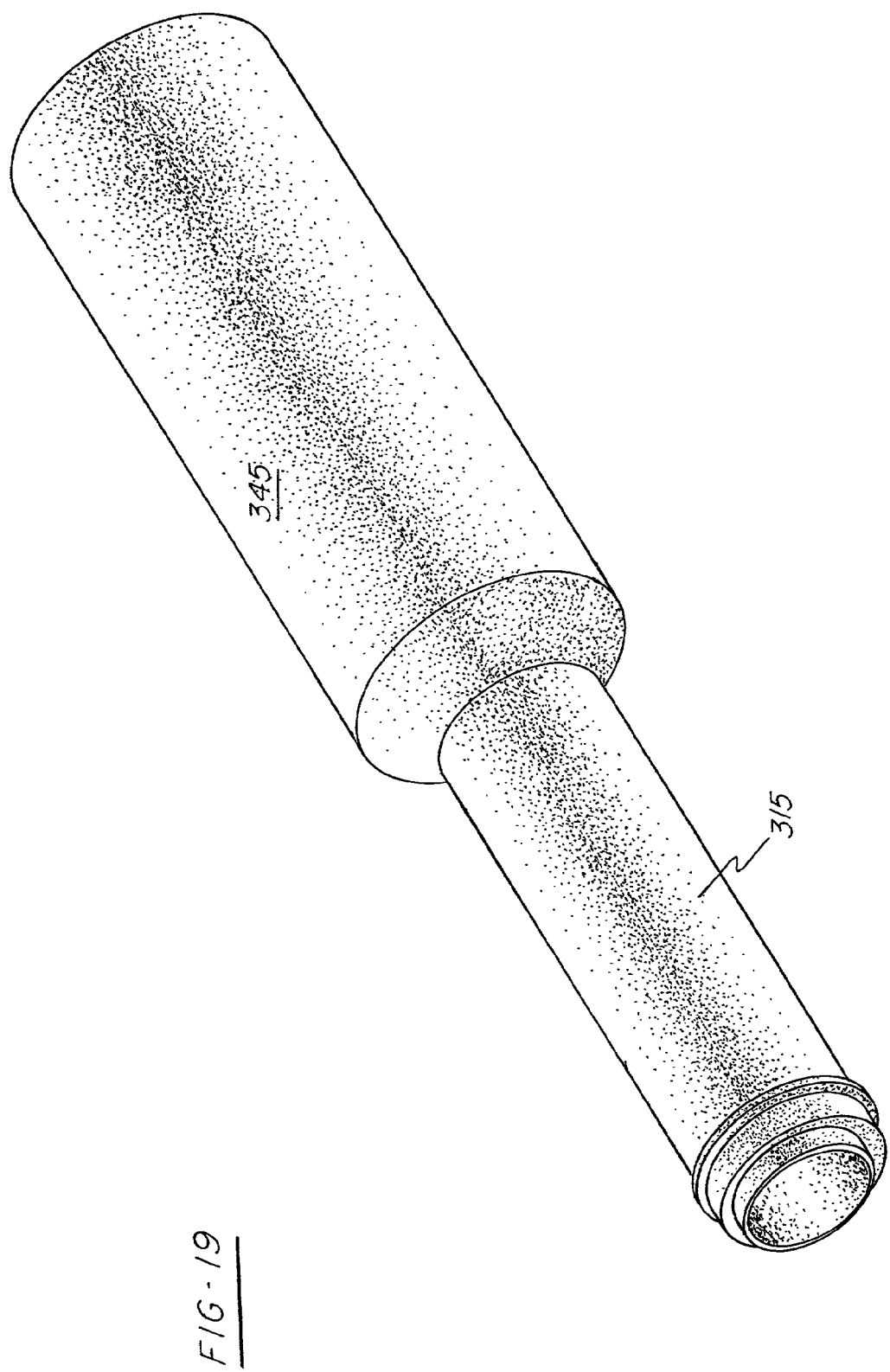

US 6,986,855 B1

STRUCTURAL AND OPTICAL APPLICATIONS FOR SHAPE MEMORY POLYMERS (SMP)

CROSS REFERENCE TO RELATED APPLICATION

Priority benefit of U.S. provisional application Ser. No. 60/263,986 filed Jan. 24, 2001 is claimed.

FIELD OF THE INVENTION

The present invention relates to methods of making molds from shape memory polymer (SMP) materials and to molds made thereby. More specifically, the present invention relates to SMP molds for producing castable composite parts.

BACKGROUND OF THE INVENTION

Known processes for fabricating castable composite parts are very complicated and expensive. A large portion of the complexity and expense is associated with manufacturing related molds.

Typically, the first step in producing a castable composite part is to acquire a prototype that embodies the desired features; the prototype is given to a tool and die facility that makes molds for replicating the prototype. The prototype part may encompass an assembly of individual components, in which case a series of individual molds are required. In some cases, the mold is manufactured directly from a set of drawings in a three dimensional computer readable format which embody the desired features. A mold, a set of molds or set of pieces to make a mold is often referred to as "tooling."

Often times, castable composite parts are made with resins which require a thermal curing operation subsequent to being injected into the mold in a liquid state and prior to being removed therefrom in a solid state. Therefore, molds for producing castable composite parts are typically made of metal, usually a type of steel or aluminum with an associated melting temperature above the anticipated curing temperature of the associated resin. Machining methods associated with producing metal molds are very expensive. Typically, a mold for casting a part with high surface definition and intricate three dimensional detail is the most complex and expensive.

Processes for manufacturing castable composite parts typically employ a plurality of molds. The individual molds are assembled, the resin is injected, the mold with resin is subjected to heat, the cured part is removed and the mold is recycled to produce another part. It is common to coat the interior portions of the mold with a "mold release agent" prior to injecting the resin. The mold release agent assists in removal of the cured part from the mold. In the case of a complex part and a mold with many pieces, the processes associated with handling the mold are costly.

The high initial cost associated with making metal molds requires high production of the associated composite part to make the overall process cost effective. High cost is compounded with regard to complex parts in that the processing costs are escalated as well. With known molding technology, subsequent changes in the part and single part production are expensive and, oftentimes, uneconomical and unfeasible.

Metal molds limit the complexity of the associated part which can be produced. Since the resin is injected into the mold as a liquid and then is cured within the mold to form a solid composite part, metal molds used to cast complex parts must be adequately separable such that the cured part can be removed without damage. Complex parts with high surface definition and three-dimensional shape variations require molds which are comprised of multiple pieces; the individual mold pieces are designed to separate relative to the castable composite part shape.

Additionally, metal molds are not transparent, therefore, classes of resins which are cured using ultra-violet (UV), visible (VIS), near infrared (NIR) or infrared (IR) light are not compatible. Use of UV and IR light for curing is preferred in many cases. Inherently, visual inspection of the interior of a metal mold is not possible. Therefore, air bubbles, or the like, which get trapped inside the mold and embedded in the casted part are undetected until the cured part is removed from the mold, at which time it is too late to correct and the cured part is scrap. High scrap rate further increases the cost of the associated composite part.

Therefore, there remains a need in the art of molding castable composite parts for methods of manufacturing molds and molds made thereby which are applicable to producing replicas of, as few as, a single part which incorporates high surface definition and intricate three dimensional detail in a timely manner. Additionally, there remains a need in the art for a method of making a mold that is transparent and that deforms to automatically eject the cured part from within the mold.

SUMMARY OF THE INVENTION

Methods of manufacturing molds from shape memory polymers (SMPs), in accordance with the present invention, solve many of the currently existing needs in the art of molding castable composite parts.

The first materials to be reported as exhibiting a shape memory effect were shape memory alloys (SMAs). SMPs typically exhibit a higher percentage of strain recovery and shape change than SMAs. Additionally, lower cost and better processability make SMPs viable for implementation into an array of applications.

SMPs are a unique class of polymers that soften and harden quickly and repetitively on demand. The SMP's ability to transition from a soft to a hard state within a very narrow temperature span is a key physical property which allows processed SMP materials to maintain full structural rigidity up to a specifically designed activation temperature, or "glass transition temperature ($T_g$)," and become softened with a slight elevation in temperature above $T_g$.

The physical characteristics of SMP materials provide a viable solution to the above mentioned needs in the art of molding castable composite parts. The methods of making molds and molds made thereby, in accordance with the present invention, exploit the SMP characteristics.

The SMP material is first processed by solvent casting, die casting, extrusion, molding and annealing, or the like, into a "memorized" shape. As is described in detail herein, the preferred memorized shape is oftentimes a flat sheet. In other embodiments of the present invention a memorized shape, at least partially, inverted with respected to the "deformed" shape is preferred.

The processed SMP is then deformed from its memorized shape into the desired "deformed" shape. In the preferred embodiment of the present invention, the deformed shape is a shape which results in a replica of the desired part. The deformed SMP will "relax" to the memorized shape when its temperature is raised above $T_g$. This characteristic of SMPs is exploited with regard to automatically ejecting, or "demolding," a cured composite part from within the given mold.

Deformation of the processed SMP can take place with the SMP above or below $T_g$ depending upon the elasticity of the given SMP and the intricacy of the given part to be replicated. If the SMP is deformed while its temperature is above $T_g$, the SMP temperature will have to be lowered below $T_g$ prior to removal of the applied deformation force. If the applied deformation force is removed with the SMP temperature above $T_g$, the SMP will relax to its memorized shape and will not retain the desired deformed shape.

SMP molds can be inexpensively produced in various highly detailed shapes and forms. SMP materials typically have a very narrow temperature span in which they transition from hard to soft and vice versa. With as little as 5° C. to 10° C. increase above $T_g$, the SMP quickly softens and allows shape change and subsequent re-hardening into new shapes.

Composite parts have previously been cast in molds made of thermoplastics. The use of SMPs as molds was not previously feasible in industrial applications because the $T_g$s of available SMP materials were too low. In most cases, the temperature that was required to cure the resin cast within the mold would be higher than the $T_g$ of the SMP mold material. Therefore, the SMP mold would relax back to its memorized shape before the resin part would have a chance to cure.

By exploiting the properties which SMPs posses, many problems that are found in current metal molds are solved. The SMP material can be easily produced and is inexpensive. SMPs' ability to replicate fine details allow numerous high precision inexpensive SMP molds to be formed from a single master part or master mold. These characteristics of SMPs enable resins that have long cure times to be used more efficiently. This increase in efficiency is achieved by moving the curing process into numerous inexpensive SMP molds thus freeing an expensive master mold for further SMP mold fabrication. Consequently, production rates can be greatly increased at a low overhead cost.

Due to the wide ranges of achievable mechanical properties of different SMP formulas, molds can be made in many various methods including draping, vacuum forming, computer controlled mechanical technology and stamping. Stamping may be performed with the SMP either above or below the given $T_g$. Thus, the SMP can be made to embody intricate detail.

Another favorable property of the preferred SMP, in accordance with the present invention, is that it is transparent in the UV-VIS-NIR-IR and E-beam spectral ranges. Transparency of the mold allows the penetration of a wide range of light for curing purposes and allows visual inspection of the associated casted composite part during the injection and curing steps.

The methods of making molds from SMP materials in accordance with the present invention facilitate revolutionary processes for producing castable composite parts. The SMP is first processed into a desired memorized shape by any one of a number of processes. The processed SMP is deformed from its memorized shape into the desired mold shape. The liquid resin is then injected into the SMP mold; other composite components, such as reinforcing fabric may be inserted into the mold prior to injection of the resin. The part is cured by any one of a number of thermal, or non-thermal, curing processes while within the SMP mold. After the part cures, the SMP mold is simply raised above $T_g$ which induces the SMP to relax to its memorized shape and eject, or demold, the part. The SMP material is then recycled within the castable composite part manufacturing process by again deforming the SMP into the desired mold shape.

The methods of manufacturing SMP molds in accordance with the present invention enable economical production of, as few as, a single castable composite part having high surface definition and intricate three-dimensional detail. Transparent molds provide low initial costs, low handling costs, and result in lower part scrap rates for the manufacturer.

These and other advantages of the present invention will become apparent when the following detailed description of the invention is read in light of the accompanying drawings and appending claims.

BRIEF DESCRIPTION OF THE DRAWINGS

FIG. 7 depicts a perspective view of the shape memory material of FIG. 6 subsequent to being separated from the article to be replicated;

FIG. 8 depicts an elevational view of a shape memory material, which was processed to form a flat sheet, proximate an article to be replicated with intricate three dimensional detail and having a vacuum assist means integral therewith;

FIG. 19 depicts a perspective view of a shape memory polymer mandrel system being withdrawn from a hollow manufactured composite part.

DETAILED DESCRIPTION OF THE INVENTION

Figure 1:
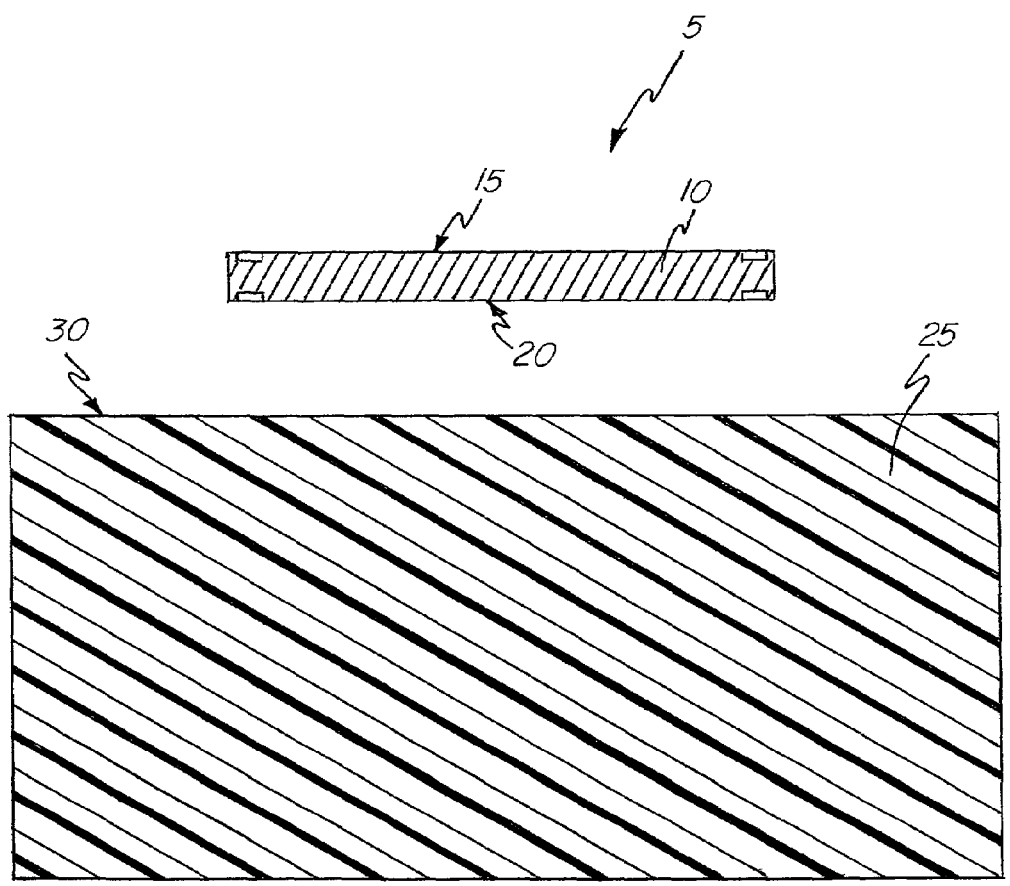
FIG. 1 depicts an elevational view of a processed shape memory material in its memorized shape proximate a part to be replicated, shown as a coin, prior to engagement therewith.

Shape memory materials derive their name from an inherent ability to return to their original "memorized" shape after undergoing a shape deformation. Shape memory alloys (SMAs) and shape memory polymers (SMPs) are two known materials which exhibit shape memory properties.

There are many polymer types that exhibit shape memory characteristics. Several research groups have considered the shape memory properties of polymers having two phases or showing crosslinked structure. Much of this research has concentrated on polyurethane-type SMPs. Another SMP system, disclosed in Kagami et al., Macromol. Rapid Communication, 17, 539–543 (1996), has categorized the shape memory characteristics of copolymers based on stearyl acrylate with acrylic acid or methyl acrylate.

An example of a SMP for use in accordance with the present invention is polynorbornene powder as can be purchased from Zeon Chemicals located in Louisville, Ky. under the product name Norsorex NS. The powdered Norsorex NS is processed into a desired memorized shape by any one of a number of processing methods, some of which are disclosed herein. The preferred SMP processing method for Norsorex NS is hot-pressing because a transparent processed SMP is obtained. Norsorex NS is a polymer that has been proven to be compatible with the present invention. Additionally, other types of SMPs and shape memory alloys can be used as discussed herein.

As disclosed in U.S. Pat. No. 4,831,094 to Stein et al., which is incorporated herein by reference hereto, the polymeric material can consist of a composition comprising a polymer selected from amorphous and semi-crystalline homopolymers and copolymers of norbornene and its alkylated, cyano, alkoxylated, mono- or diesterified, imides and carboxylic acid derivatives, homopolymers and copolymers of dimethanooctahydronaphthalene and its derivatives, and copolymers of dimethanooctahydronaphthalene, and of a monomer selected from norbornene, and its derivatives, styrene, acenaphthalene, and dicyclopentadiene wherein the polymer can be hydrogenated or halogenated.

The polymeric material can comprise a polyurethane-type SMP or a SMA, which is a metallic material comprising usually nickel-titanium alloys. Perhaps the simplest example of a SMP is polynorbornene which is a member of the class of polyhedral oligomeric silsesquioxanes (POSS). Highly entangled polynorborene has been reported to exhibit excellent shape recovery due to its long relaxation time (for temperatures slightly higher than $T_g$) and convenient proximity to room temperature ($T_g \approx 35–50°$ C.).

A SMP has been developed finding particular application in the manufacture of optical quality lenses. Specifically, the SMP of the instant invention is particularly compatible with the polymers of which the optical quality lenses are made.

In accordance with the present invention, a new class of SMPs, useful in the manufacture of optical quality lens molds, is provided. This new SMP is prepared from a reaction product of styrene, a vinyl compound other than styrene, a multifunctional crosslinking agent, and an initiator.

The present invention uniquely employs SMPs as the material of construction of mold members in the manufacture of optical quality lens. SMPs having the properties discussed earlier may be utilized in the formation of optical quality lens mold members as well. Thus, SMPs, which include norbornene homopolymers and copolymers of norbornene and alkylated, cyano, alkoxylated, mono- or diesterified imides or carboxylic acid derivatives may be employed. In addition, the copolymer may include dimethaneoctahydronapthalene (DMON) as a comonomer. Alternatively, homopolymers of DMON, as well as copolymers of DMON and styrene, acenapthalene or dicyclopentadiene, which may be hydrogenated or halogenated, may be employed.

Although these known SMPs are within the contemplation of the present invention, it is preferred that the SMP, employed in the formation of the optical quality lens of the present invention, be a SMP which comprises, a copolymer of styrene and a vinyl compound other than styrene.

This preferred copolymer is prepared from a reaction mixture which includes, in addition to styrene and the vinyl compound, a crosslinking agent and an initiator. Indeed, by careful preparation of the reaction mixture, $T_g$ of the resulting SMP can be synthesized to match the operating temperature of the optical quality lens manufacturing process.

In a preferred embodiment of the present invention, the reaction mixture includes, in addition to the first monomer which is styrene, the second monomer which is a vinyl compound other than styrene, the crosslinking agent which is a multifunctional compound, and an initiator, a fifth component, a modifying polymer.

The second monomer, a vinyl compound other than styrene, is preferably vinyl neodecanoate, vinyl benzoate, vinyl propionate, vinyl stearate, a methylstyrene, which may be a mixture, 3-methylstyrene or 4-methylstyrene, a vinyl pyridine, which may be a mixture, 2-vinyl pyridine, 3-vinyl pyridine or 4-vinyl pyridine, vinyl laurate, vinyl butyrate, vinyl acetate, vinyl stearate, vinyl 2-furate, vinyl phenylacetate, vinyl carbazole, 4-vinylbenzyl acetate, 4-vinylbenzoic acid, vinyl methyl sulfone, vinyl octadecyl ether, vinyl isooctyl ether, N-vinyl-2-pyrrolidone, -vinyl-N-methylacetamide, 1-vinylimidazole, N-vinylformamide, -vinylcaprolactam, vinyl azolactone, N-vinylurea, 4-(vinyloxy)butyl stearate, 4-(vinyloxy)butyl benzoate, 4-(vinyloxymethyl)cyclohexylmethyl benzoate, methyl acrylate, methyl methacrylate, butyl acrylate, t-butyl acrylate, butyl methacrylate, t-butyl methacrylate, hexyl acrylate, acrylic acid, methacrylic acid, benzyl acrylate, benzyl methacrylate, 2-n-butoxyethyl methacrylate, 2-cyanoethyl acrylate, cyclohexyl acrylate, cyclohexyl methacrylate, decyl acrylate, dicyclopentenyl acrylate, dicyclopentenyloxyethyl acrylate, dicyclopentenyloxyenthyl methacrylate, dodecyl acrylate, dodecyl methacrylate, 2-ethoxyethyl methacrylate, 2-exthylhexyl acrylate, ethyl methacrylate, 2-hydroxyethyl acrylate, 2-hydroxyethyl methacrylate, isobornyl acrylate, isobornyl methacrylate, 2-(2-methoxyethoxy)ethyl acrylate, 2-(2-methoxyethoxyl)-ethyl methacrylate, 2-methoxyethyl acrylate, 2-methoxyethyl methacrylate, 2-methoxypropyl acrylate, 2-methoxypropyl methacrylate, octyl methacrylate, 2-phenoxyethyl acrylate, 2-phnoxyethyl methacrylate, phenyl acrylate, 2-pheylethyl acrylate, 2-phenylethyl methacrylate, phenyl methacrylate, propeyl acrylate, propyl methacrylate, stearyl acrylate, stearyl methacrylate, 2,4,6-tribromophenyl acrylate, undecyl acrylate, or undecyl methacrylate.

Of the vinyl compounds preferred for use in the reaction mixture of the SMP of the present invention, vinyl neodecanoate, vinyl benzoate, vinyl propionate, vinyl stearate, methylstyrene, 4-(vinyloxy)butyl stearate or a vinyl pyridine are particularly preferred.

The crosslinking agent of the SMP reaction mixture is multifunctional, that is, the crosslinking agent as a compound has a polymerizable functionality of at least 2. Indeed, difunctional crosslinking agents are preferred. Crosslinking agents within the scope of the present invention include diallyl fumarate, diallyl diglycol carbonate, allyl methacrylate, diallyl phthalate, diallyl suberate, diallyl tetrabromophthalate, diethylene glycol diacrylate, diethylene glycol dimethacrylate, diethylene glycol divinyl either, N,N'-dimethacryloylpiperazine, 2,2-dimethylpropanediol dimethacrylate, dipentaerythritol pentaacrylate, dipropylene glycol dimethacrylate, ditrimethylolpropane tetraacrylate, divinyl glycol, divinyl sebacate, glycerol trimethacrylate, 1,5-hexadiene, 1,6-hexanediol diacrylate, 1,6-hexanediol diacrylate, 1,6-hexanediol dimethacrylate, N,N'-methylenebismethacrylamide, 1,9-nonanediol dimethacrylate, pentaerythritol tetraacylate, pentaerythrtol triacrylate, pentaerythritol triallyl ether, 1,5-pentanediol dimethacrylate, poly(propylene glycol) dimethacrylate, tetraethylene glycol dimethacrylate, triethylene glycol diacrylate, triethylene glycol dimethacrylate, triethylene glycol divinyl ether, 1,1,1-trimethylolethane trimethacrylate, 1,1,1,-trimethylolopropane diallyl ether, 1,1,1-trimethylolpropane triacrylate, 1,1,1-trimethylolpropane trimethacrylate, tripropylene glycol diacrylate, 1,2,4-trivinylcyclohexane, divinyl benzene, bis(2-methacryloxyethyl)phosphate, 2,2-bis(4-methacryloxyphenyl)propane, 1,3-butanediol diacrylate, 1,4-butanediol diacrylate, 1,3-butanediol dimethacrylate, 1,4-butanediol dimethacrylate, 1,4-butanediol divinyl ether, 1,4-cyclohexanediol dimethacrylate, bis[4-(vinyloxy)butyl]isophthalate, bis[4-(vinyloxymethyl) cyclohexylmethyl]glutarate, bis[4-(vinyloxy)butyl]succinate, bis((4-((- vinyloxy)methyl)cyclohexyl)methyl)isophthalate, bis[4-(vinyloxy)butyl] terephthalate, bis[4-(vinyloxy)methyl]cyclohexyl] methyl terephthalate, bis[4-vinyloxy)butyl]adipate, bis[4-vinyloxy)butyl](methylenedi-1,4-phenylene)biscaramate, bis[4-vinyloxy)butyl] (methylenendi-1,4-phenylene)bicarbonate, bis [4-(vinyloxy)butyl](4-methyl-1,3-phenylene)bicarbonate, bis[4-(vinyloxy)butyl]1,6-hexanediylbiscarbamate or tris[4-vinyloxy)butyl]trimelliate.

Of these preferred crosslinking agents, divinyl benzene bis[4-(vinyloxy)butyl] terephthalate and bis[4-[(vinyloxy) methyl]cyclohexyl]methyl terephthalate are particularly preferred. Of these, divinyl benzene is even more particularly preferred as the crosslinking agent.

The initiator of the reaction mixture may be a free radical or an ionic initiator. Free radical initiators within the scope of the present invention include organic peroxides and azo compounds. Although any of the commercially available organic peroxides may be utilized, tert-butyl peroxide, tert-butyl hydroperioxide, benzoyl peroxide, dicumyl peroxide and lauroyl peroxide are particularly preferred. Similarly, although any commercially available azo initiating compounds may be utilized, 2,2'-azobisisobutyronitrile is particularly preferred. The ionic initiators are preferably cationic initiators. Preferred cationic initiators include boron trifluoride, boron trifluoride diethyl etherate, aluminum trichlrotide and tin (IV) chloride.

As stated above, the SMP reaction mixture may include a fifth, optional component. That optional component is a modifying polymer. The modifying polymer acts as a viscosity adjustor and, additionally, provides the requisite toughness to the resultant SMP. The requisite toughness of the cured SMP product is a toughness that meets the quantitative requirements set forth in ASTM Standard Test Procedures D5045 and D6068.

The modifying polymer of the SMP reaction mixture is a thermoplastic polymer that is compatible with the polymer formed by the reaction product of styrene and a vinyl compound. Preferred compatible polymers include olefin polymers and styrene polymers. Particularly preferred compatible polymers include polystyrene, poly(styrene-cobutadiene), polyethylene and polypropylene. Of these, polystyrene is particularly preferred as the modifying polymer in the SMP reaction mixture.

The constituents of the SMP reaction mixture are present such that the styrene monomer constituent represents between about 30% to about 95%, the vinyl monomer constitutes between about 5% and about 60%, the crosslinking agent constitutes between about 0.5% and about 5%, the initiator is present in a concentration in the range of between about 0.1% and about 4% and the modifying polymer, if present, represents between about 0.5% and about 60%, all of the above recited percentages are by weight based on the total weight of the SMP reaction mixture.

Preferably, the constituents of the SMP reaction mixture are present in the following concentration ranges, again reported as percentage by weight, based on the total weight of the reaction mixture: styrene monomer, about 40% to about 85%; vinyl monomer, about 5% to about 20%; crosslinking agent, about 0.6% to about 3%; initiator, about 0.5% to about 3%; and modifying polymer, if present, about 5% to about 50%.

More preferably, the constituents of the SMP reaction mixture include between about 50% and about 80% styrene monomer; between about 5% and about 14% vinyl monomer; between about 1% and about 2.5% initiator; and, if present, between about 10% and about 40% modifying polymer. As stated previously, these percentages are by weight, based on the total weight of the SMP reaction mixture.

The SMP reaction mixture is polymerized by reacting the mixture at a temperature in the range of between about 20° C. and about 150° C. and a pressure in the range of between about 14.7 psi and about 50 psi over a time period in the range of between about 2 seconds and 4 days to produce a crosslinked SMP.

In a preferred embodiment, the polymerization reaction to produce the thermosetting SMP of the present invention, occurs at a temperature in the range of between about 50° C. and about 110° C. and a pressure in the range of between about 14.7 psi and about 25 psi over a period of between about 1 minute and 3 days.

More preferably, the polymerization reaction conditions under which the thermosetting SMP is formed from the SMP reaction mixture is a temperature in the range of between about 65° C. and about 75° C., a pressure in the range of about 14.7 psi over a range of between about 4 hours and about 1.25 days.

The following examples are provided to illustrate the scope of the present invention. Because these examples are given for illustrative purposes only, the invention should not be deemed limited thereto.

EXAMPLE 1

A polymeric reaction mixture comprising 7% vinyl neo-decanoate, 1% divinyl benzene, 2% benzoyl peroxide, and 90% styrene, wherein the percentages were by weight, based on the total weight of the mixture, was heated in an oven maintained at atmospheric pressure and a temperature of 75° C. for 24 hours.

A clear sheet of a cured SMP was obtained at the conclusion of this polymerization reaction.

EXAMPLE 2

A polymeric reaction mixture comprising 7% vinyl neo-decanoate, 1% divinyl benzene, 2% benzoyl peroxide, 30% polystyrene, and 60% styrene, wherein the percentages were by weight, based on the total weight of the mixture, was heated at 75° C. at atmospheric pressure for 24 hours.

A clear sheet of a cured SMP was obtained at the conclusion of this polymerization reaction.

SMPs are processed into a desired memorized shape by one of a number of known processes. Die casting, hot pressing, solvent casting and extrusion are a few of the known means for processing SMP powder or resin into a memorized shape. Other processing methods are in accordance with this invention as well. Some pre-processed SMPs can be molded and annealed to obtain an alternate memorized shape. Annealing allows the related polymer network to retain the desired memorized configuration in a "relaxed" state. Preferably, the SMP is processed to define a memorized shape in the form of a flat sheet or as an "inverted" image with respect to the associated "deformed" shape ultimately desired for the given mold.

Die casting is the preferred method of processing the styrene based SMP as described in examples 1 and 2 above. Die casting involves placement of a liquified SMP into a mold and exposing the SMP to an elevated temperature.

Hot-pressing is preferred for Norsorex NS because a transparent SMP results from it. Hot-pressing involves two thick, well-polished aluminum plates between which a mask is placed. A uniform layer of SMP powder is distributed over the masked region and the plates are slowly heated to 100° C. and pressed together with a pressure of 70 kPa (10 psi). The pressure is then increased to 14 MPa (2000 psi) and the temperature is increased to 200° C. These conditions are maintained for some length of time ("process time").

Process parameters for pressed films such as time, pressure, temperature, and surface preparation vary widely. Process time has been varied from 30 minutes to six hours. Longer process times reduce material flow patterns but allow more oxidation to occur. Pressed films have been produced with temperature ranges from 170° C. to 200° C. and pressures from 3.5 MPa to 27.5 MPa (500 psi to 4000 psi). Pressures above 7 MPa (1000 psi) allow the material to congeal to a semitransparent amber. Below this pressure, the material does not congeal, resulting in a light beige, foam like material. Higher pressures also reduce oxidation and reduce the processing time necessary to insure that all the material congeals. Higher temperatures appear to decrease processing time, decrease flow patterns, increase oxidation and lower the pressure needed to congeal this material.

Extrusion of a powdered SMP involves the following five steps: Densification of the material; degassing the densified material; heating, melting and pressurizing the material; forming the melt; and cooling the formed material.

First, the SMP powder is packed together, and mechanical force is used to compress the particles. The material then is degassed by placing it in a vacuum chamber; this will remove any solvents, dissolved gasses or moisture from the material. Heat and pressure is applied to form a hot melt. The melt then flows to the die through which it is forced, yielding the desired shape (e.g. sheet, tube, or I-beam). The extruded SMP is immediately quenched to prevent oxidation of the material. Following extrusion of the SMP part, a heat treatment may be required to relax any residual stresses present in the polymer network. These heat treatments are conducted at temperatures above $T_g$ and below the oxidation temperature.

Solvent casting involves first dissolving the SMP powder in hot xylene. The solution is then cast in a custom casting dish. Drying can be accomplished by placing the film in a fume hood at room temperature for several days and then placing it under vacuum at 60° C. for 12 hours. However, permitting the SMP film an additional 48 hours of drying time in the fume hood in ambient conditions, followed by 12 hours at 75° C. obviates the need for vacuum drying.

Carbon fibers may be added to the chosen SMP material to increase the structural rigidity of the associated SMP membranes and structures made therefrom. The carbon fibers are incorporated during processing of the SMP powder. Typically, carbon fiber reinforcement is incompatible when transparency is desired because the carbon fibers tend to darken the processed SMP.

A study was instituted to explore the repeatability of the shape memory effect for a given processed SMP. Table 1 shows the results of two strain-recovery trials for five different samples. Each of the five samples was obtained from a single processed Norsorex NS SMP; therefore, each sample should be expected to have identical properties as the other four samples. Samples with effective dimensions of 5 cm×0.63 cm×0.09 cm were placed in a tensometer and stretched until the sample had fully "necked." Following the stretch, sample lengths were measured. Samples were then placed in an oven at 75° C. for approximately 20 minutes, following which sample lengths were measured again. This process was repeated a second time for all five samples. A remarkable recovery was observed for all samples and both trials.

TABLE 1

Strain recovery for 5 samples (stretched at room temperature).

| Sample | Trial | Original Length | Stretched Length | Percent Stretch | Recovered Length | Percent Return |
|---|---|---|---|---|---|---|
| 1 | 1 | 1.964 | 6.000 | 305.499 | 1.950 | 100.007 |
| 2 | 1 | 2.000 | 5.656 | 282.800 | 1.944 | 100.028 |
| 3 | 1 | 1.969 | 6.266 | 318.233 | 1.919 | 100.025 |
| 4 | 1 | 2.000 | 6.250 | 312.500 | 1.964 | 100.018 |
| 5 | 1 | 1.938 | 6.219 | 320.898 | 1.921 | 100.009 |
| 1 | 2 | 1.950 | 5.813 | 298.103 | 1.948 | 100.001 |
| 2 | 2 | 1.944 | 6.219 | 319.907 | 1.944 | 100.000 |
| 3 | 2 | 1.919 | 5.500 | 286.608 | 1.912 | 100.004 |
| 4 | 2 | 1.964 | 6.063 | 308.681 | 1.961 | 100.002 |
| 5 | 2 | 1.921 | 3.625 | 188.704 | 1.922 | 99.999 |

Figure 15:
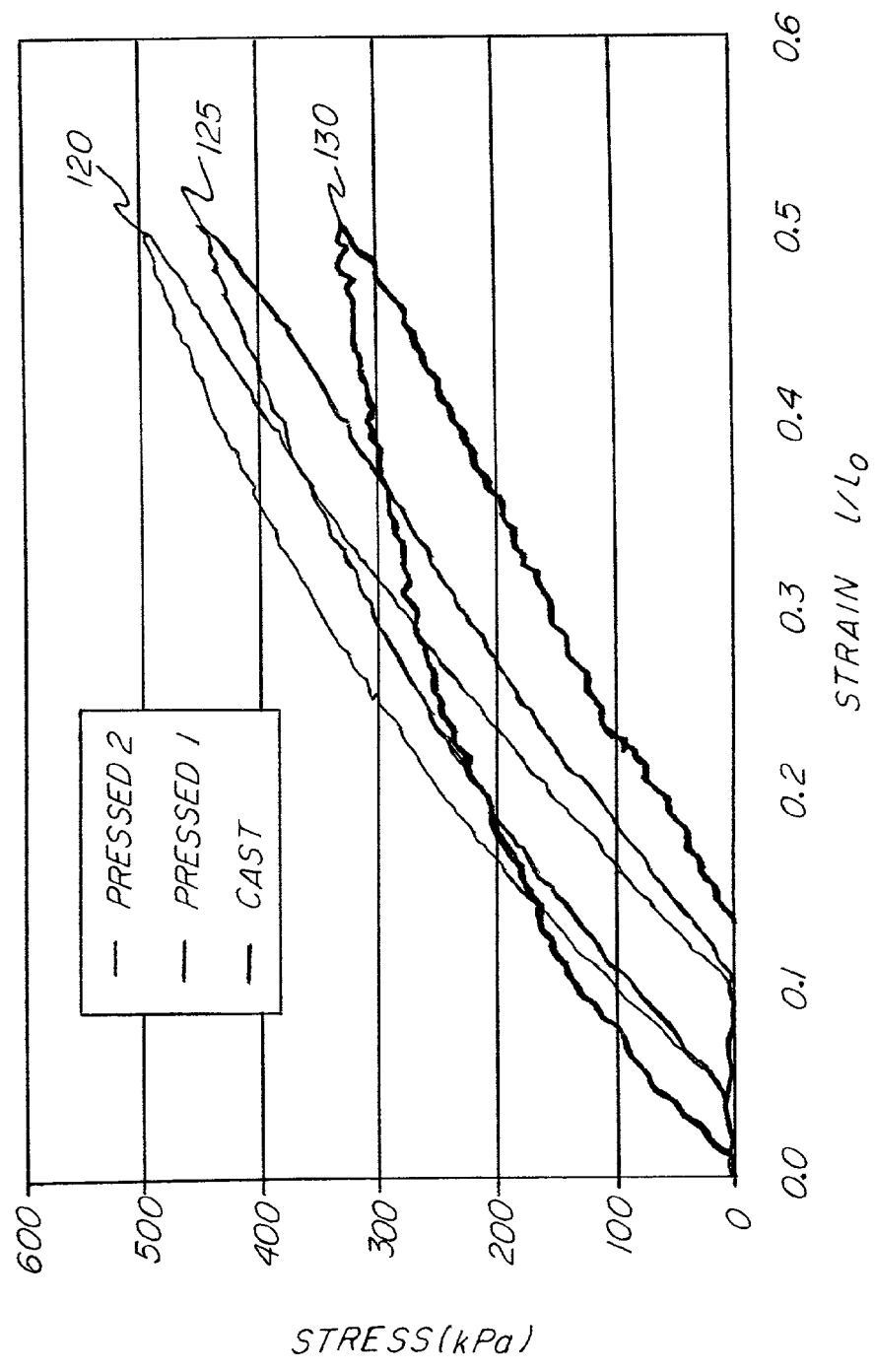
FIG. 15 depicts the stress-strain hysteresis curves for three individually processed shape memory polymers.

Additionally, three samples, fabricated by three different techniques, were stretched in the manner described above. FIG. 15 contains individual stress-strain hysteresis curves 120, 125, 130 for the three samples. One sample was fabricated via solvent casting, resulting in curve 130. The "Pressed 1" data denotes a sample that was fabricated using the hot press method; it was pressed at 200° C. for 3 hours, resulting in curve 125. The third sample, having data denoted "Pressed 2," was also fabricated via the hot press method but was pressed at 200° C. for 6 hours, resulting in curve 120. All three samples exhibited elastic behavior (as can be seen by the hysteresis curves) and returned to their original undrawn length.

Shaping the SMP mold can be accomplished through anyone of a number of known deforming techniques. The SMP material can be molded over very detailed master objects and made to retain very detailed surfaces. It is this ability to replicate fine details that allow numerous high precision inexpensive SMP molds to be manufactured from a single prototype part or master mold.

This enables resins that have long cure times to be used more efficiently. This increase in efficiency is achieved by moving the curing process into numerous inexpensive SMP molds thus freeing an expensive master for further mold fabrication. This effectively means that for a low overhead cost, production rates, per day could be greatly increased. Due to the wide range of achievable mechanical properties of different SMP formulas, molds can be made in many various methods.

Stamping can be utilized when a desired mold shape requires more force to be formed than atmospheric pressure such as a deep draw or very intricate details. Stamping of shapes can be done in two different approaches depending on the mechanical properties of the SMP material that is desired. The first technique is to "cold" press the desired shape into the SMP material (stamp the SMP at a temperature lower than the polymer's glass transition temperature). This can only be done if the type of SMP being used has a modulus of elasticity that will allow this deformation without tearing or cracking. If the modulus of elasticity of the SMP is not high enough to endure cold stamping then the second technique must be used. This approach is to simply raise the polymer's modulus of elasticity by pressing the material while it is heated to a temperature that is above it's $T_g$. However the material must then be cooled down under it's $T_g$ before the stamping pressure can be removed. Otherwise the desired shape would not be retained.

FIGS. 1–5 depict the stamping process 5 in regard to replication of a given coin 10. FIG. 1 depicts the coin 10, with upper surface 15 and lower surface 20, prior to being stamped into the upper surface 30 of the shape memory material 25. For illustrative purposes, the lower surface 20 forms a mirror image of the upper surface 15.

Figure 2:
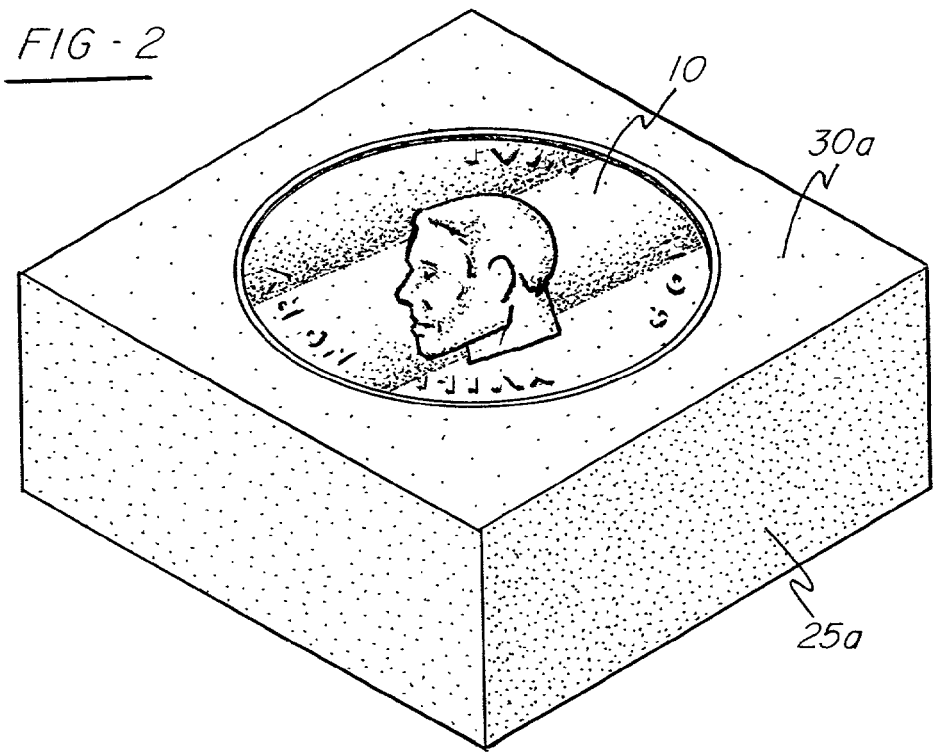
FIG. 2 depicts a perspective view of the shape memory material of FIG. 1 deformed with the coin being stamped therein and remaining embedded therein.

With reference to FIG. 2, the coin 10 has been stamped into the deformed upper surface 30a of the deformed shape memory material 25a. Preferably, the temperature of the shape memory material 25 has been elevated above $T_g$ prior to coin 10 being stamped therein. The temperature of the deformed shape memory material 25a is lowered below $T_g$ prior to removal of the coin, such that the deformation is retained. In cases where the elasticity of the shape memory material 25 facilitates the deformation with a corresponding temperature below $T_g$, the coin 10 is simply removed and the deformed shape memory material 25a remains so deformed.

Figure 3:
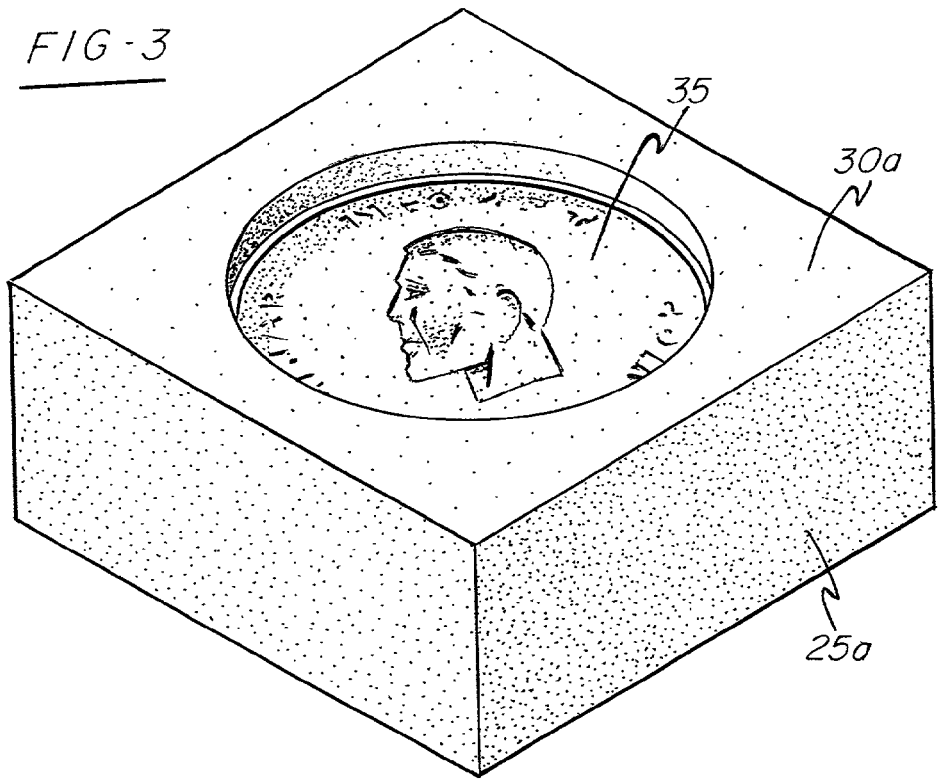
FIG. 3 depicts a perspective view of the deformed shape memory material of FIG. 2 subsequent to the coin being removed and the associated deformed shape remaining.
Figure 4:
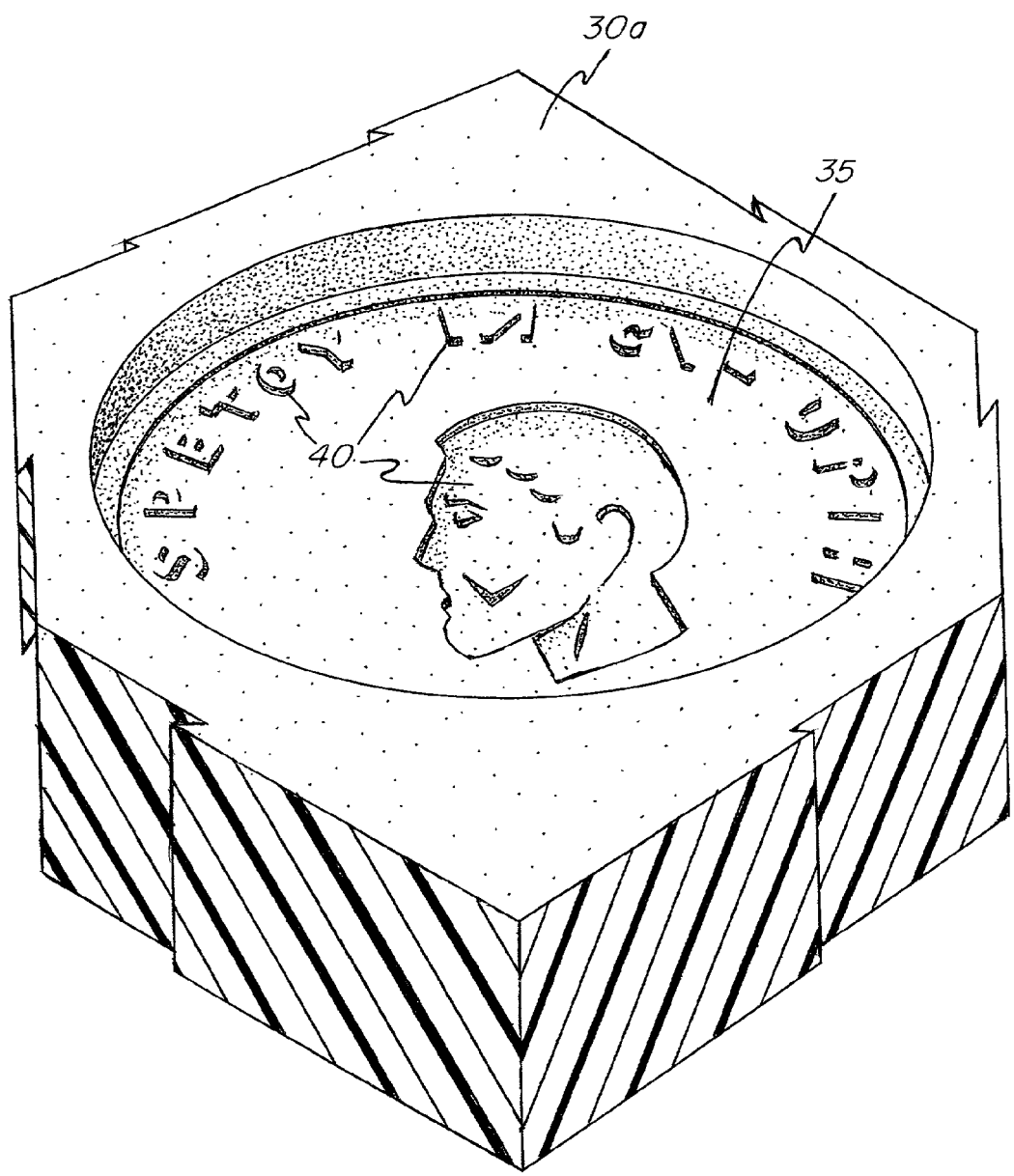
FIG. 4 depicts a perspective view of a section of the deformed shape memory material of FIG. 3 showing the retained intricate three dimensional detail.

FIG. 3 depicts the deformed upper surface 30a of the deformed shape memory material of FIG. 2 with the coin 10 removed. As can be seen, the lower surface 20 of the coin 10 is replicated in the deformed shape memory material as impression 35. The high surface definition and intricate three dimensional detail 40 of impression 35 is shown in FIG. 4 in a magnified view. The deformed shape memory material 25a will retain this deformed shape until the corresponding temperature is increased above $T_g$, therefore, a replica of coin 10 can be cast within impression 35. The deformed shape memory material 25a will relax to its memorized shape, as shown in FIG. 1, once the temperature is elevated above $T_g$.

As can be appreciated, a second deformed shape memory material can be employed to replicate the upper surface 15 of coin 10. The coin 10 can be stamped into the two individual shape memory materials at given depths such that the two shape memory materials can be joined together to define a mold for producing a replica of the entire coin with corresponding equal dimensions. The two mold pieces can be joined together, as described below, along on adjoining edge such that the memorized shape is with the mold in an open arrangement. The mold can be deformed to the closed position such that later elevation of temperature of the shape memory materials above $T_g$ will result in the deformed mold opening and tending to eject, or demold, the cured castable composite part therefrom. It will be appreciated that the coin 10 is used for illustrative purposes and that in no way is the present invention limited to replication of a coin. The stamping process 5 in accordance with the present invention can be used to replicate a host of prototype parts.

Draping is similar to vacuum forming in that a SMP sheet is raised above the $T_g$ of the particular material and placed over a mold. However, only the force of gravity presses the sheet over the mold. When the material is cooled the molds impression is left. Draping is only effective when little detail is needed, and curves and bends are gradual.

Figure 5:
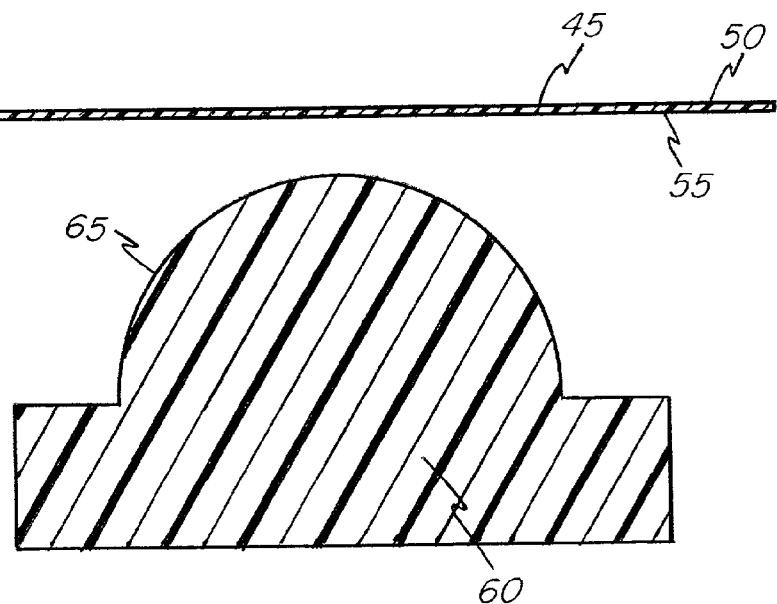
FIG. 5 depicts an elevational view of a shape memory material, which was processed to form a flat sheet, proximate an article to be replicated prior to engagement therewith.
Figure 6:
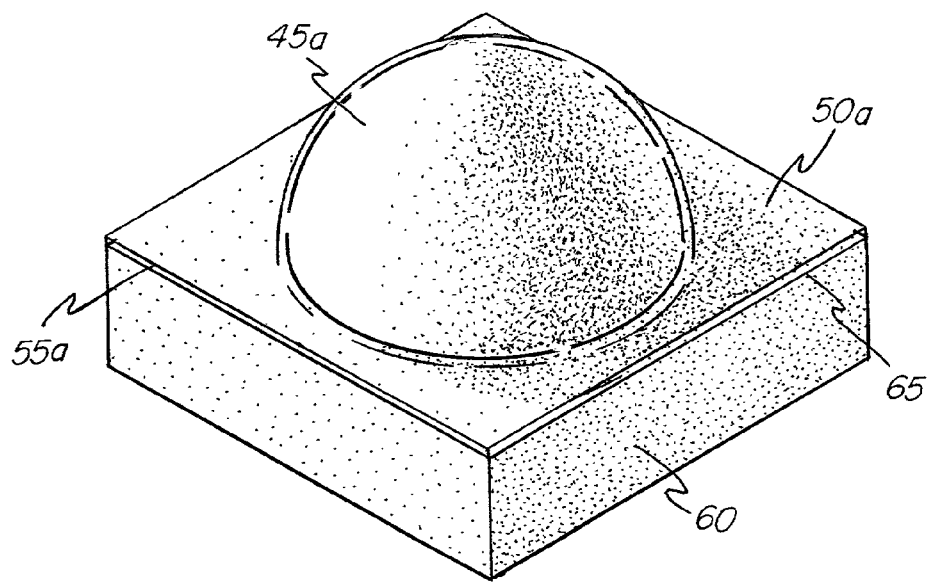
FIG. 6 depicts a perspective view of the shape memory material and article to be replicated of FIG. 5 subsequent to the shape memory material being deformed by draping it over the article to be replicated.

The draping process is depicted in FIGS. 5–7. As can be seen from FIG. 5, a shape memory material 50 has been processed to form a flat sheet with upper surface 50 and lower surface 55. The shape memory material 50 is shown proximate a prototype part 60 with surface 65 to be replicated.

FIG. 6 depicts the shape memory material 50, from FIG. 5, subsequent to being draped over part 60 and as forming the deformed shape memory material 50a with deformed upper surface 45a and deformed lower surface 55a. The temperature of the shape memory material 50 is increased above $T_g$, the material 50 is draped over surface 65 and the temperature is lowered below $T_g$.

FIG. 7 depicts the deformed shape memory material of FIG. 6 subsequent to being separated from part 60. As can be seen, both the deformed upper surface 45a and the deformed lower surface 55a have retained shape which replicates the shape of surface 65.

The deformed shape memory material 50a is ready to use as a mold, a mold insert or as a part, in and of itself, for use in optical or mechanical devices.

Vacuum forming is a series of processes for forming thermoplastic sheet or film over a mold with the application of heat and pressure differentials due to a drawn vacuum. A thin sheet of SMP material is heated above it's $T_g$, it is quickly placed over a desired mold. Then a vacuum is created by removing the air between the mold and the SMP sheet. With the removal of this air, the standard atmospheric pressure of 14.7 psi forces the sheet tightly over the mold. When the sheet has cooled below the polymer's $T_g$ it will retain the shape of the mold. This method is very versatile since it can be done with a wide range of SMP materials with a wide range of mechanical properties.

Figure 9:
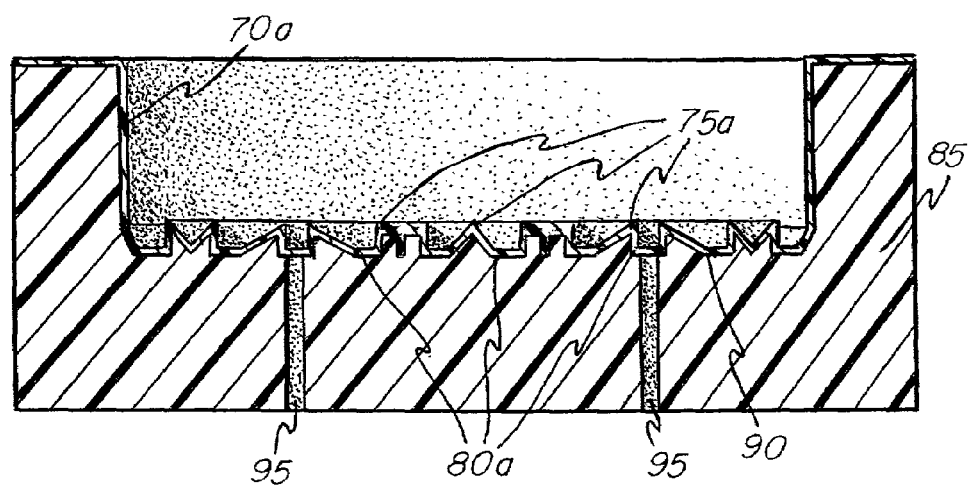
FIG. 9 depicts a perspective view of the shape memory material and article to be replicated of FIG. 8 subsequent to the shape memory material being deformed with vacuum assist over the article to be replicated.
Figure 10:
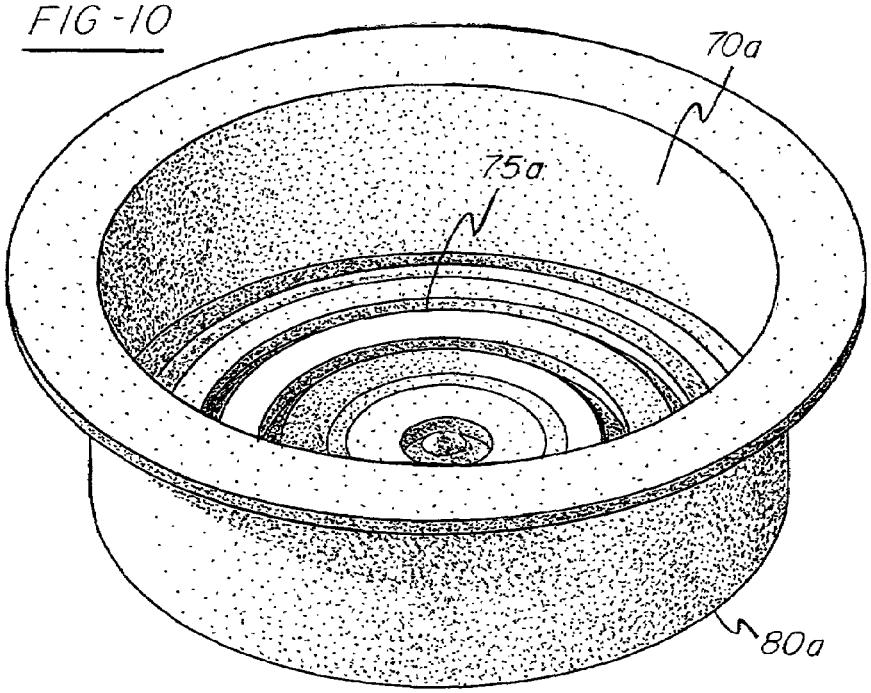
FIG. 10 depicts a perspective view of the shape memory material of FIG. 9 subsequent to being separated from the article to be replicated.

FIGS. 8–10 depict a shape memory material 70 which has been processed to form substantially a flat sheet with upper surface 75 and lower surface 80. In FIG. 8, the shape memory material 70 is shown proximate a mold 85 with intricate detail 90 to be replicated. The mold 85 is shown with vacuum openings 95.

With reference to FIG. 9, the shape memory material 70 has been drawn into mold 85 such that the deformed upper surface 75a and deformed lower surface 80a of the deformed shaped memory material 70a replicate detail 90.

The temperature of the shape memory material 70 is elevated above $T_g$ and a vacuum is applied to openings 95. The heated shape memory material 70 is place proximate mold 85 and becomes drawn toward mold 85 such that the replication of detail 90 is encouraged.

The deformed shape memory material 70a, with deformed upper surface 75a and deformed lower surface 80a, is shown in FIG. 10 subsequent to being disengaged from mold 85. The deformed shape memory material 70a is usable as a mold or as a part. It will be appreciated that the shape memory material 70 can be used in accordance with the present invention in any memorized shape.

The deformed SMP 70a can remain in the mold 85 and a resin injected therewithin to form a castable composite part. The temperature is raised to cure the resin, however, the temperature is kept below $T_g$ of the given SMP until the resin cures. Once the resin solidifies to form the desire castable composite part, the temperature is raised above $T_g$ and the shape memory material relaxes, thereby, ejecting the cured part from within the mold.

It should be appreciated that the shape memory material can be heated in selective areas or may comprise various SMP materials, with varying $T_g$s, to further improve cured part demolding. The perimeter of the SMP could be encouraged to relax first, followed by other portions, until finally the entire SMP is heated above all $T_g$ S.

Automated mechanical methods of forming SMP molds from CAD generated drawings can be achieved with a system of scanning and planar linear actuators. This approach can enable rapid production of small to large molds and facilitates rapid prototyping methodologies broadly across the composite industry.

After the SMP mold has been made through whichever means is best fitting, the next step is to cast the desired part and then to allow curing. There are many advantages that SMP molds have over conventional mold in this step. First, since the SMP material is transparent, as the resin is injected into the mold a visual inspection of the process can occur. If an undesired air bubble exists in the part it can be seen and removed before the curing process is began. This eliminates wasted time and energy of curing air bubble filled parts. Also the transparent property allows composite to be cured by means other than a temperature increase to initiate and aid in curing. As an alternative method different forms of light such as UV or IR could be used to cure the resins. This is important because the use of E-beam, VIS, NIR, IR and UV light cures would replace the current method of heat curing.

Molds made of the preferred classes of polymers, which possess shape memory mechanical properties, have an advantage over conventional metal molds in the demolding process. After the composite part has been given a chance to cure, the SMP mold is simply raised above $T_g$, which allows it to relax to its memorized shape, preferably a flat sheet or an inverted image of the mold. This creates a gentle, automated demolding process. Rigid material molds have a tendency to remain adhered to the parts in high detailed areas therefore most demolding actions are very violent. This means that a large percentage of parts that were of good quality before the demolding process are unusable after this step in the process. The slow natural retracting motion of the preferred class of SMPs in accordance with the present invention eliminates this problem. Also, since the material returns to the memorized shape, it is ready to be deformed back into another mold.

Many advantages stand to be gained with the replacement of metal and other types of molds with SMP mold. Less time will be spent between design concept to actual production. A greater flexibility will be gained. Demolding is greatly simplified and number of lost parts is reduced. These beneficial SMP characteristics all lead to the largest and most important advantage associated with SMP molds, the savings in cost to produce an composite part. Since the cost is reduced, the number of parts that must be produced to be cost effective is greatly reduced. This makes the production of low quantity single parts feasible.

Finally there are aspects of this process that revolutionize the composite industry. A casting process can now easily produce composites. An inexpensive means to increase production now exist. Also, this process allows an infinite stock keeping unit (SKU) manufacturing philosophy on a single production line. Finally, this process enables an effective means of curing composites by means of E-beam, UV, VIS, NIR and IR energy.

Because SMPs are thermally activated, it is necessary to provide a heat source to heat and activate the SMP. The heat source can be as simple as supplying warmed water, heated air, heated gas, steam, etc to thermally activate the SMP. Other heat sources may involve using various heating devices to supply the necessary heat to thermally activate the SMP. One such preferred heating device comprises a resistive heating wire which supplies a controlled amount of heat. The heating wire can be embedded within, or wrapped around, a SMP. Additionally, thermally conductive fibers can be pressed into a SMP to aid thermal conduction.

A laser is another heating device that can provide a heat source to thermally activate, or alter, a SMP. One such laser process system consists of the following primary components: an infrared (IR) laser diode used as a light source to provide heat to the SMP, a series of optical components to shape the beam such that IR light is symmetric and uniform at the SMP sample, and a translation stage to control the position of the sample with respect to the heat source.

The preferred computer-controlled, high-power laser diode is capable of generating over 1 watt of optical energy at a wavelength of approximately 810 nm. To control the power output of the laser diode and the exposure time, custom digital drive electronics have been developed that are controlled via LabVIEW software. The preferred optics consist of commercially available collimation optics together with a pair of cylindrical lenses to capture the asymmetric beam and shape the spot into a line with uniform intensity. The final component, on which the sample is mounted, is a translation stage that is driven by a LabVIEW controlled monitor. Having control over both laser power and translation rate, it is possible to controllably release stored mechanical energy, which can be utilized to introduce a desired curvature to a SMP film.

The heat source for actuation of SMPs is not limited to IR laser diodes. For configurations in which heat must be delivered uniformly to a larger device, the IR laser diode will be inadequate. Deployment of various SMP devices has been demonstrated utilizing an IR heat lamp, such as a Series CB available from DRI located in Clearwater, Fla.

The laser processing of a SMP can be improved through the addition of a thin layer of laser absorbing dye on a single surface of the film. The preferred laser absorbing dye is NP 800 available from Exciton, Inc., in Dayton, Ohio. When exposed to the laser, the dye absorbs the incident radiation and the SMP is heated preferentially, releasing the strain on only one side of the film. This asymmetric relaxation of the film results in concave curvature of the dyed surface. Uniform curvature was achievable by passing the membrane strip under the laser several times at a constant rate of 0.0725 mm/s.

SMPs can be used to produce various optical quality parts. To demonstrate membranes for optical systems, it is necessary to develop the processing required for optical quality surfaces. Currently, the materials as cast have a RMS surface roughness on the order of 10 nm and a residual surface topography of 10 µm. However, in a molding process, the surface can replicate the surface finish of a mold resulting in an RMS surface roughness of 6 nm.

The deformed shape memory material 50a, from FIG. 7, can be used for casting optical lenses. This mold is particularly suited to casting optical lenses because the mold is able to correct for optical aberrations by locally addressing the film in a manner that will alter the surface topography. Since most equations in optics must be derived using paraxial approximations (approximations that rays are parallel to or at small angles with the optical axis), optical systems based on these equations are only partially correct. The inclusion of higher-order terms in the mathematical expansions of certain functions predicts increasingly larger departures from "perfect" imaging as angle (with respect to the optical axis) increases. These imperfections are referred to as aberrations. The limiting factor in the resolution and performance of most optical systems, including space-based optical systems, is quite frequently the aberrations in the wavefront, which can arise from a vast array of sources.

Currently, optical quality lenses are manufactured by a number of processes. One current approach of lens manufacture is a double-sided molding (DSM) process. This processes typically involves dispensing of a liquid monomer into a female mold half, mating a male mold half to the female, and then applying ultraviolet radiation to cure the monomer. The mold is separated and the polymerized lens is removed from the mold. In a DSM process, the molded lens does not usually require surface polishing, but subsequent extraction of unreacted monomer or solvent is commonly required. Accordingly, other processes use single molding in which only the female mold half is used.

Typically, the molds in these molding processes tend to be heavy and removal of the molded lens manual and tedious. As such, there is a need for molding production process improvements which reduce production time and reduce the consumption of processing materials. In addition, reductions in environment impact are always desirable, e.g. by reducing the number of molds which must be trashed and/or recycled. The use of SMPs in molds, especially in optical quality lens molds, would provide all of these improvements by the process as disclosed below.

FIGS. 5–7 show the steps of deforming a shape memory material 50 suitable for casting optical lenses in which at least one well defined wrinkle is selectively added to a film comprising a SMP to correct for the optical aberrations in an optical lense wearer's eye(s) by directing heat to a precise location on the SMP. Preferably the film is formed by the hot-pressing method disclosed earlier.

A processed SMP film is uniformly stressed biaxially and further has a top and bottom surface. At least one precision wrinkle is then generated on the top surface of the film by providing a heat source, either a spatial light modulator or a process laser, and accurately heating the top surface of the film. The artisan will appreciate that the film provided in this optical device also can be used wrinkle free.

Next, a form is provided having a top and bottom surface with the top surface of the form being provided with a centrally located concave area. The form typically will comprise a metal. The film is centered onto the top surface of the form under vacuum such that the bottom surface of the film rests on the top surface of the form. The form and film are exposed to the atmosphere such that the film conforms to the concave area of the form. It further is conceivable that the film can be vacuum processed into the form before a wrinkle is generated.

Once the mold is ready for casting optical lenses, optical lens material can be poured into the concave area of the top surface of the film. Curing of the optical lens material is performed by using UV. After the lens material has been cured in the mold, a heat source, such as a laser or spatial light modulator, can be used to heat the SMP to cause the SMP to deform, or wrinkle, and force the cured lens out of the mold. This process dramatically decreases the production time for making optical quality lenses since removal of the lens from the mold is relatively quick and simple. Also, production cost will decrease since the mold and the SMP can be reused. Further, the artisan will appreciate that a corresponding convex, or male, mold can be utilized to mold lenses in a double-sided molding process.

Accordingly, the above process achieves a high spatial resolution on the film in a manner that creates the negative of the optical lens mold that is needed to correct aberrations. Since the surface modulation is shallow and the processing pressures relatively low, it is believed that this approach will accurately reproduce the surface topology of the film onto a final lens. In this way, when an optical lens is made from the mold, the positive will result.

Figure 16:
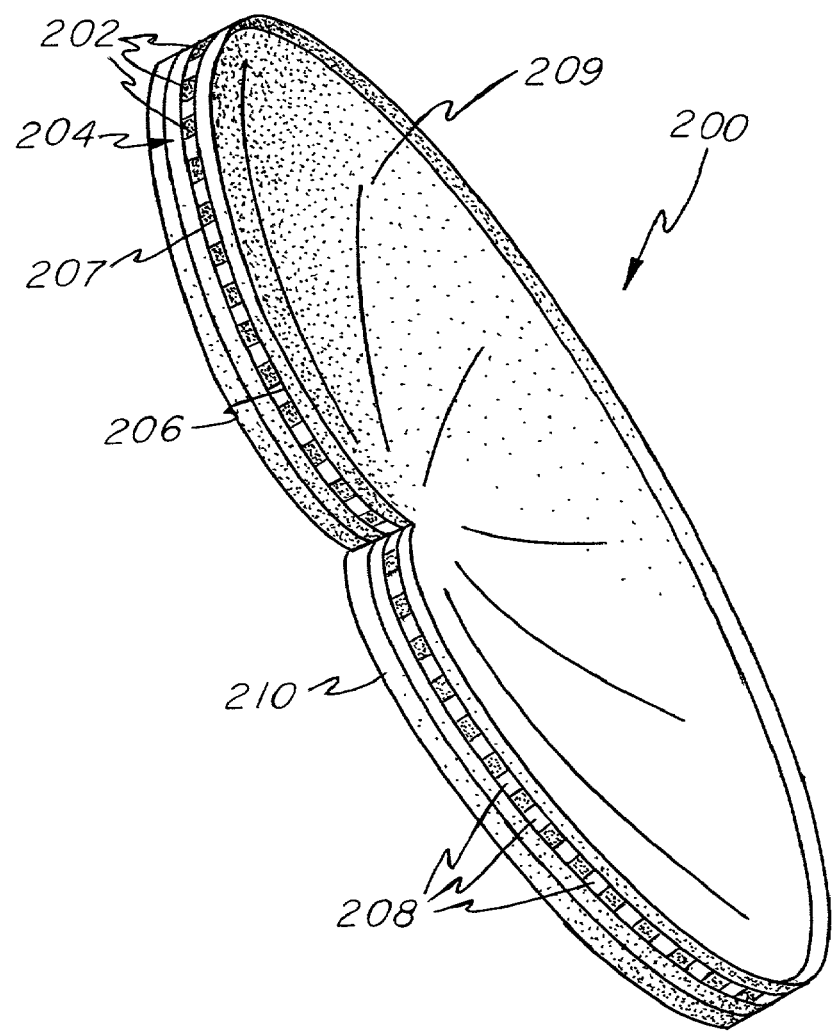
FIG. 16 depicts a perspective view of a composite part which incorporates a shape memory material.

Optical devices based on SMP materials and related process technology not previously employed in such an application are disclosed herein and can include deployable mirrors, antennas, etc. One such optical device, a deployable electromagnetic (EM) reflector shell, or space-based reflector mirror 200, as shown in FIG. 16, can be used in a space-based imaging system. Currently, the size of space-based mirrors is limited by payload and size restrictions of their launch vehicles. This device addresses both size and payload issues and can be used in imaging applications across the electromagnetic spectrum (RF to visible). The electromagnetic (EM) reflector shell comprises a first film 202 comprising a SMP 204 and being substantially hemispherical in shape. The artisan will appreciate that non-hemispherical shapes may be employed as well. The first film 202 has a front and back surface 206, 207 and further can be rolled to the diameter of a launch vehicle (not shown). The front surface 206 preferably comprises a reflective material 209. An active damping layer 208 may be integrated intermediate the front and back surfaces 206, 207 of the first film 202 so that vibrations from other satellite components can be suppressed. The active damping layer 208 typically comprises polyvinyldenefluoride (PVDF).

A support structure 210 comprising a SMP and being substantially honeycombed in shape is joined to the back surface 207 of the first film 202 to provide support thereto. The artisan will appreciate that non-honeycomb shapes also may be employed. The support structure 210 further can be collapsed. Due to the SMP properties, a first film 202 that has been rolled will unroll into its memorized shape and a support structure 210 that has been collapsed will uncollapse to provide support for the first film 202 after being heated to above their $T_g$ by providing heat via a heat source.

As stated above, the limiting factor in the resolution and performance of most optical devices and systems is quite frequently the aberrations in the wavefront which can arise from a vast array of sources. It has been discovered that SMP materials can be utilized to correct for the optical aberrations in these optical devices and systems, including space based optical systems such as the electromagnetic reflector disclosed above.

The steps for correcting optical aberrations in any optical device or system, such as the electromagnetic reflector 200, affected by optical aberrations is accomplished by providing and utilizing a SMP material, preferably a polynorbornene based material, to impart a desired contour to a substrate that needs to be corrected. A film comprising a SMP is used in combination with the substrate to correct for optical aberrations. The substrate may comprise a mirror, such as a telescopic or reflective mirror, a lens, glass, or the like and may be comprised itself of a SMP.

The first step is to form a film comprising a SMP having a top surface that is optically smooth and having a bottom surface with surface relief features. The top surface of the film may be coated with a reflective material. Preferably the film is formed by the hot-pressing method disclosed earlier. The surface relief features allow precise control of local topography of the top surface both spatially as well as in depth. A substrate, preferably a mirror, is provided having a top and bottom surface. The bottom surface of the film is bonded to the top surface of the substrate using an adhesive containing a laser absorbing dye, preferably NP 800.

The second step is to crush the bottom surface of the film onto the top surface of the substrate and maintain the crushed shape by keeping the SMP at a temperature below its $T_g$. Since the goal is to crush and lock in the surface relief pattern so that it can be relaxed under heating, this crushing will bend, fold or squash the surface relief features.

The third step is to provide a heat source to heat the SMP. Here, the preferred heat source is a laser which selectively heats the top surface of the film thereby releasing the stored strain to locally lift the top surface and impart a desired contour to compensate for the optical aberrations of the substrate.

In the final step, the end product, a substrate having shape memory properties with a modified surface that has compensated for optical aberrations. Notably, any optical aberrations presented by the electromagnetic reflector could be corrected as outlined in the above steps by applying a second film comprising a SMP, and having the properties stated above, to the front surface of the first film and then performing the steps as outlined above. The front surface of the second film preferably is of optical quality.

One potential advantage of the above process is that the surface layer could be used multiple times before the SMP film would require replacement.

SMP materials can be formed into many useful shapes and apparatuses. SMP molds are merely one such use.

Figure 11:
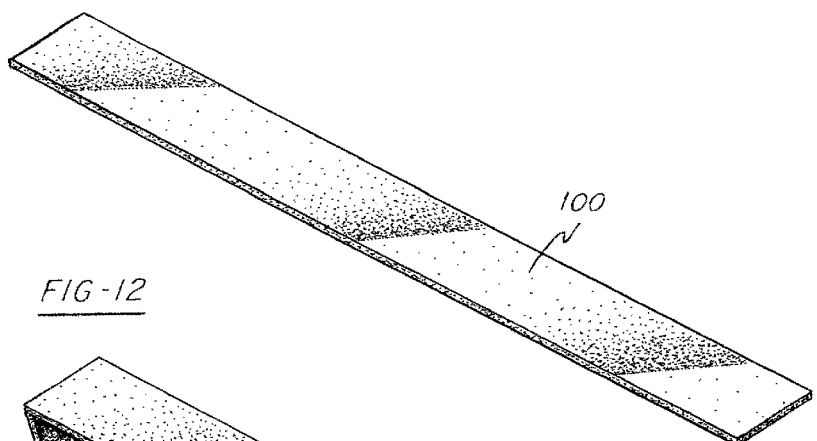
FIG. 11 depicts a perspective view of a shape memory material processed into a flat strip.

FIG. 11 depicts a shape memory material 100 which has been processed to form a substantially flat strip.

Individual pieces of processed SMP material can be joined together. The joining process entails softening the areas of the SMPs that will be joined by exposing them briefly to xylene. This can be accomplished by spraying xylene onto the surface of the SMP or by briefly immersing the SMP in xylene. The areas that are to be joined are then overlapped and heated, which results in bonding the SMPs. To improve the quality of the joint, a solution of SMP powder in xylene can be placed between the SMPs being joined.

Figure 12:
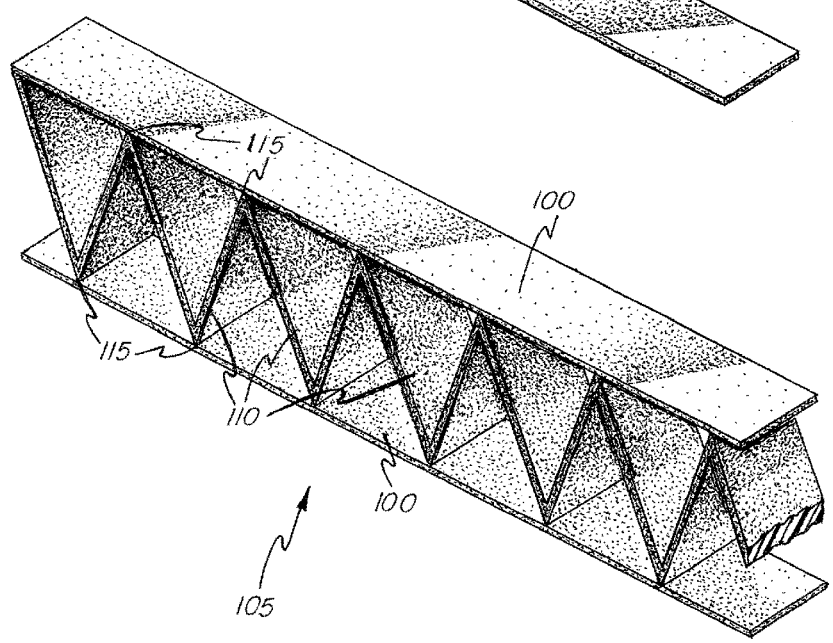
FIG. 12 depicts a perspective view of an assembly of individual pieces of shape memory material forming a truss.

FIG. 12 depicts a truss 105 which has been formed by joining individual pieces of shape memory material 100 with web portions 110. The pieces of shape memory material 100 and the individual webs are connected according to above joining process at connection points 115. The webs 110 can be formed from individual pieces of shape memory material or by reforming, or deforming, a continuous strip.

Figure 13:
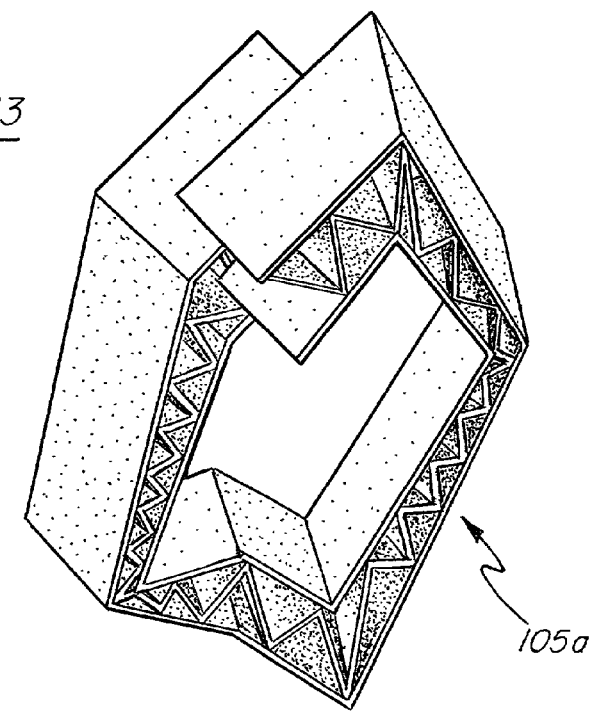
FIG. 13 depicts a perspective view of the truss of FIG. 12 subsequent to being deformed into a compact "ball;"

The truss 105 is shown in FIG. 13 as a deformed truss 105a. The truss 105 can be deformed with the temperature above or below $T_g$ depending on the given elasticity. In either event, when the temperature of the deformed truss 105a is raised above $T_g$, it will relax to the truss 105 shape.

Figure 14:
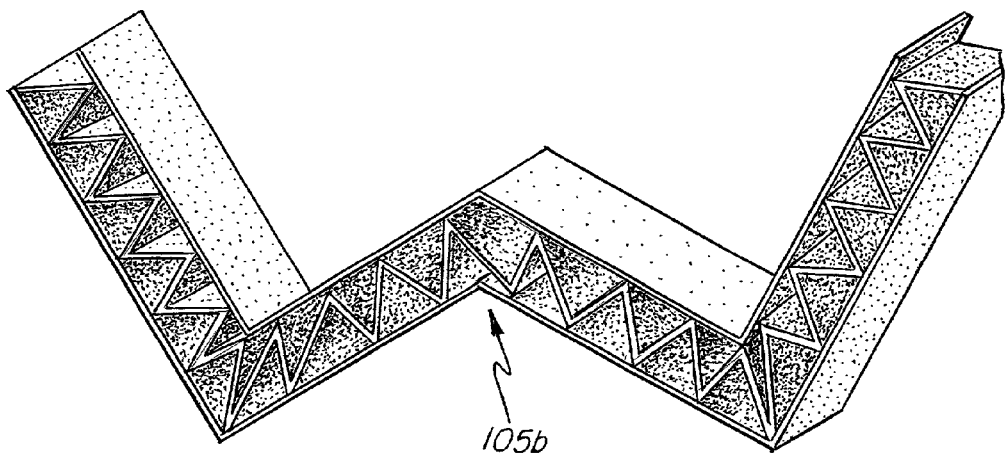
FIG. 14 depicts a perspective view of the deformed truss of FIG. 13 with the shape memory material relaxing to its memorized shape of FIG. 12.

FIG. 14 depicts the partially deformed truss 105b as a representation of the deformed truss 105a as it begins to relax to the memorized shape of truss 105. As can be appreciated, many such mechanical devices can be assembled, deformed to fit in a smaller space, transported to a desired site and then relaxed to the memorized shape by simply elevating the temperature above $T_g$. This characteristic of shape memory materials allows for a number of practical applications.

Figure 17:
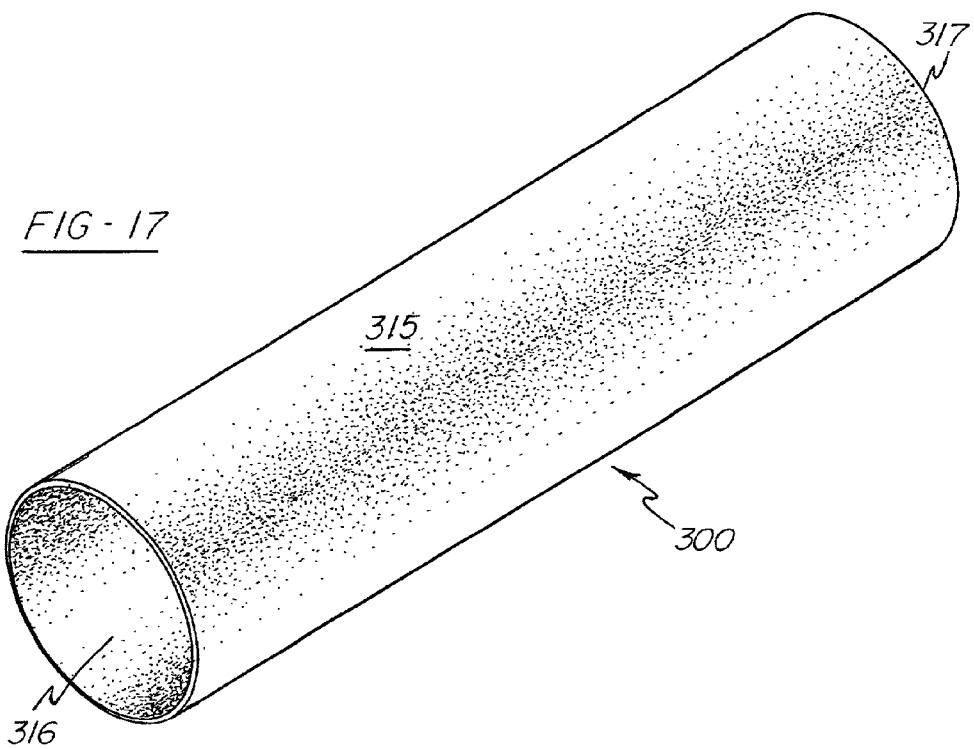
FIG. 17 depicts a perspective view of a shape memory polymer processed into a substantially tubular memorized shape.
Figure 18:
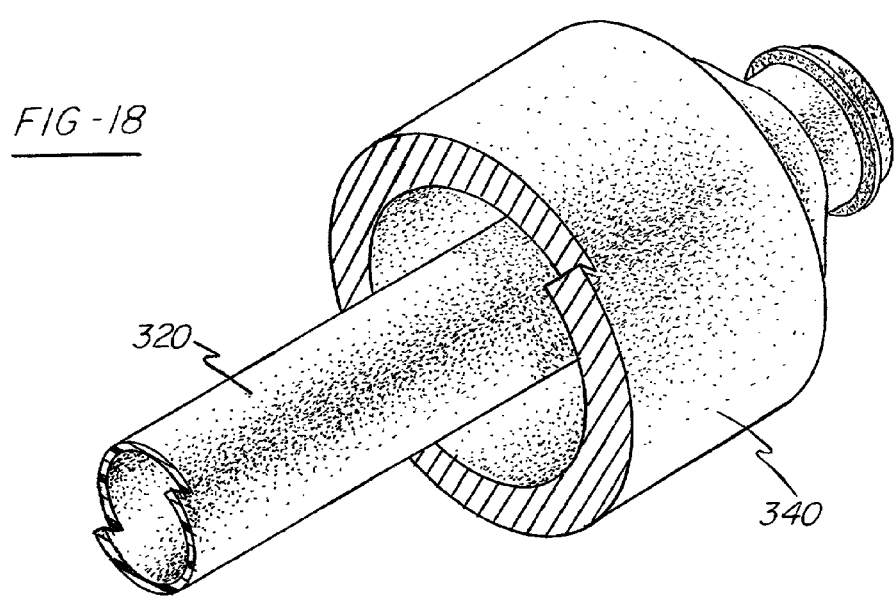
FIG. 18 depicts a perspective view of a shape memory polymer mandrel system for manufacturing a hollow composite part.

Turning now to FIGS. 17–19, there is shown a SMP mandrel system FIG. 18 for manufacturing a hollow composite part 345. As shown in FIG. 17, a SMP material is processed into a substantially tubular memorized shape 315. The tubular shape 315 may comprise one open end 316 and one closed end 317 or two open ends.

The substantially tubular SMP 315 is then placed onto a rigid tube like structure 320 for additional support and "inflated" into a deformed tubular shape mandrel 340 as shown in FIG. 18. With the preferred SMP, the deformed SMP mandrel shape 340 can be significantly larger than the corresponding memorized shape 315.

Preferably, the substantially tubular shaped SMP mandrel 315 is deformed by inserting the SMP mandrel system FIG. 18 into a mold cavity which has an inner surface in a shape to be replicated by the outer surface of the deformed SMP mandrel 340. Although, as described herein for illustrative purposes, the preferred shaped mandrel is substantially tubular, other mandrel shapes are within the scope of the present invention.

Resin soaked fiber reinforcement is then filament wound around the deformed SMP mandrel 340 to produce a hollow composite part 345. The composite part 345 and mandrel system FIG. 18 is then further processed with autoclave or other additional standard composite processes and cured utilizing any one of a number of curing techniques. Subsequent to curing the composite part 345, the temperature of the deformed SMP mandrel system FIG. 18 is elevated above the $T_g$ of the SMP material from which the SMP mandrel blank 315 is comprised, inducing the deformed SMP mandrel 340 to relax to its memorized shape 315 which comprises an outer dimension less than a corresponding opening of the cured composite part 345 through which the SMP mandrel system FIG. 18 with a relaxed mandrel blank 315 is to be withdrawn through. The relaxed SMP mandrel system is then simply removed from within the cured composite part 345 through the corresponding opening.

The SMP mandrel system FIG. 18, as described above, is useful in manufacturing solid rocket motor (SRM) casings, filament-wound hollow composite components, bottles, and other composite parts comprising a, at least partially, hollow interior portions.

The SMP mandrels, in accordance with the present invention, replaces the complex and expensive rubber inflatable mandrels, multi-piece metal mandrels and water-soluble salt or sand mandrels which are currently used in known manufacturing processes. The advantages associated with SMP molds, as stated herein, apply equally with regard to the SMP mandrel.

Designing and manufacturing known mandrels is extremely time consuming and expensive. Additionally, the resources required for assembling and handling known mandrels escalates related castable composite part production.

Hinge devices manufactured of SMP materials can be used in a multitude of applications. Generally, SMP material is processed to form a flat strip. The flat strip is deformed by folding it about a centerline thereof and holding the deformed strip while reducing the SMP temperature below $T_g$. When the SMP temperature is later raised above $T_g$, the hinge will relax to the memorized, flat, shape. The temperature induced motion of the hinge can be translated into a number of functional applications. Promising uses include the following: terrestrial applications, such as in remote micropositioning applications (i.e., cameras, sensors, etc.), and space-based applications, such as assisting in the launching of satellites or being used in, or as, components in space technologies.

An accordion type apparatus, having a tensile design and shape memory properties, is constructed by stacking a plurality of individual hinges comprising a SMP with less SMP material being provided intermediate each first and second end of the stacked hinges. The SMP preferably is a polynorbornene based SMP. Each hinge preferably has been formed by the hot pressing method disclosed above. Thermally conductive fibers are included within the SMP to aid thermal conduction.

A heat source, preferably a heating wire, is placed in thermal communication with the SMP by being wrapped around at least one of the plurality of layers. Preferably, the resistive heating wire is made of nickel chromium. The heating wire further is provided perpendicular to and intermediate the first and second ends of the plurality of hinges. Xylenes are added to soften the ends of the hinges and the hinges are compressed to form an accordion having a first and second end. Preferably, less SMP is located between hinges to define a plurality of pivot points. The pivot points allow the individual hinges to pivot when the SMP is heated above $T_g$ to undergo shape transformation. The artisan will appreciate that the accordion can be formed by simply using two hinges.

An apparatus having a torsion design and shape memory properties comprises a rod made from a SMP having a top, bottom, and mid portions and having a central channel therethrough. The SMP preferably is a polynorbornene based SMP. An extrusion process preferably is used to form the rods. In this process the rods are fabricated by tamping SMP powder, preferably polynorbornene, into a 1.25 cm copper pipe, the interior of which has been coated with polytetrafluoroethane (PTFE) so that the rod easily can be removed; heat and pressure then are added, causing the material to congeal into the form of a rod. SMP rods approximately 1 meter in length and 1.25 cm in diameter are formed by this process.

The bottom portion of the rod is pivotally secured to a mounting plate, and an aluminum sheath having a central opening therethrough is secured over the top portion of the rod such that the central opening and central channel are in open communication with each other. As shown here, two heat sources, an aluminum foil heat reflector and a flexible heating wire, are placed in thermal communication with the rod to provide a controlled heat source. Specifically, the aluminum foil heat reflector is encircularly disposed about the midportion of the rod and the flexible heating wire runs through the central channel of the rod and the central opening of the aluminum cap.

The rod is deformed by twisting it about its central longitudinal axis. Subsequent heating of the deformed rod results in a rotational motion which can be translated into a number of functional applications.

An alternate use of a SMP hinge is to function as a latch. In a closed position, this latch comprises a plurality of first and second latching sections. The plurality of first latching sections being in substantial vertical alignment, and the plurality of second latching sections also being in substantial vertical alignment and spaced apart from and in an off-set parallel relationship with the plurality of first latching sections. Each of the plurality of first and second latching sections comprise a top plate having a top and bottom and a base portion parallel with the top plate. The base portion further has a flange extending radially outwardly therefrom. The flange has a top and bottom. A pivot pin is secured to the top of the flange and extends radially outwardly therefrom and is located substantially adjacent the base portion. A spring is encircularly disposed about the pivot pin. A rod comprising a SMP having a top, bottom, and mid portion is secured centrally to the top plate by the top portion and the bottom portion is securely attached centrally to the base portion. The SMP preferably is a polynorborene based SMP. Also, the rods preferably are formed by the same extrusion process used to form the rods in the above disclosed torsion hinge. The SMP further has been twisted from a memorized position and is maintained in this twisted position below its $T_g$ A helical heating element is provided in thermal communication with each rod to provide controlled heat. The helical heating element is encircularly disposed about the midportion of each rod. Further, a plurality of first and second rigid structures is provided with each of the first rigid structures having a top and bottom and first and second ends and each top being separately and securely attached to a bottom of a top plate of the plurality of first latching sections substantially near the first end of each first rigid structure. Each of the first rigid structures further extending radially outwardly in parallel relation with the corresponding top plate. Each of the plurality of second rigid structures also have a top and bottom and first and second ends and are provided with an opening running from the top to the bottom and being substantially near the first end. Each opening is adapted to receive a pivot pin from a first latching section, and each of the second rigid structures further extends radially outwardly parallel with the plurality of first rigid structures. The bottom of each of the first rigid structures is in direct contact with the top of a second rigid structure such that the spring is in a compressed position. Similar to the first ends of the plurality of second rigid structures, each of the second ends of the plurality of first rigid structures is provided with an opening running from the top to the bottom and being substantially near the first end with each of the openings adapted to receive the pin from a second latching section. Each of the second ends of the second rigid structures of the plurality of first latching sections further are securely attached to a top plate of a second latching section, and each of the bottoms of the second rigid structures are in direct contact with the top of a first rigid structure such that the springs of the second plurality of latching sections are compressed. Each hinge is provided with at least two of the plurality of first and second rigid structures, having terminal ends that are not connected to first or second latching sections, so as to define the ends of the latch. When the SMP is heated to undergo phase transformation at its $T_g$, the twisted rods of the plurality of first and second latching sections untwist and pivot the base portions along a horizontal plane, thereby, releasing the compressed springs which move the plurality of first and second rigid structures vertically upwards along the length of the pivot pins. Thereby, unlatching the latch to a completely open position.

When the SMP is heated to undergo phase transformation at its glass transition temperature, the twisted rod untwists and pivots the base portion along a horizontal plane. The compressed spring is released thereby moving the second rigid structure vertically upwards along the length of the pivot pin to completely unlatch the hinge. The artisan will appreciate that the simplest design of this type of latch consists only of a single latching section and a first and second rigid structure, wherein, each rigid structure has a terminal end.

Another useful embodiment is a cylindrical tube comprising a SMP which has the ability to be compressed, to coil-up, then return to its original memorized tubular shape upon heating above its $T_g$. The cylindrical tube preferably is formed by the same extrusion process used to form the rods in the above disclosed hinges having torsion and latching designs.

A fastener comprising a SMP, preferably a polynorbornene based SMP, can be used to fastener together two or more structures. A first and second structure having openings at one end. The structures are mated such that the openings are in open communication with one another. A rod-shaped fastener comprising a SMP and having a diameter larger than the openings of the structures also is shown already having been inserted through the openings to fasten the structures together. The artisan will appreciate that more than two structures can be fastened by a fastener. In order to achieve insertion of the rod through the openings, the rod-shaped fastener must be fabricated such that its diameter is larger than the diameters of the openings. The nature of the SMP is such that it is able to remember this shape. Prior to insertion, the rod-shaped fastener is stretched lengthwise until is diameter is smaller than the diameter of the openings. The SMP may need to be quenched to below its $T_g$ to hold this shape if it is deformed above its $T_g$. Next, the fastener is inserted through the openings. Once inserted, the SMP is heated to above its $T_g$ and the fastener expands to its "memorized" shape such that its diameter is larger than the diameters of the openings to hold fast the structures. The artisan will appreciate that the rod-shaped fastener can be any diameter depending on the structural requirements of the application. To date, we have fabricated rods with diameters ranging from less than a millimeter to two centimeters. Also, multiple fasteners having various diameters may be needed and have been used to fasten structures with openings of varying diameters.

Other fastener shapes may be utilized to fasten structures. For example, a first and second structure abutted against one another with each having openings in their tops near their abutting ends. A fastener comprising a SMP and having a substantially c-shaped design wherein first and second flanges extend radially outward and substantially parallel therewith from the body of the fastener. Each flange of the fastener is inserted within an opening, and the SMP subsequently is heated to above its $T_g$ to return to its original enlarged shape to fasten the structures.

The mechanical approaches used in known SMP applications tend to be heavy, bulky, and subject to failure. Approaches such as inflatables and rigidizeable structures are being investigated, but each is limited in its scope of application. As such, the ability to deploy a larger structure packaged in a small volume is a critical need for many applications. Accordingly, the structural and optical devices disclosed herein offer an economical alternative to the current approaches and are able to utilize SMPs, preferably polynorbornene based SMPs, to enable deployment with minimal added weight or complexity.

The methods of manufacturing SMP molds and molds made thereby provide a number of advantages over known metal molds. Specifically, castable composite parts can be economically produced in, as few as, a single part which incorporate high surface definition and intricate three dimensional detail. The preferred molds are transparent, therefore, curing of the associated part within the mold utilizing ultraviolet and infra-red light is made possible. Additionally, transparent molds enable visual inspection of the interior of the mold during injection and curing of the related resins. The ability to relax the mold to a memorized shape subsequent to curing the part allows ease of removing the part from the mold. The ability to inspect the interior portions of the mold and the improved part removal result in less scrapped parts.

Therefore, use of SMP molds in accordance with the present invention revolutionizes the overall process of manufacturing castable composite parts.

What is claimed is:

1. A method of making a mold from shape memory materials for manufacturing castable composite parts with resins which are solidified within said mold by application of a curing temperature, said method comprising the steps:
   a) providing said shape memory material with a glass transition temperature which exceeds said curing temperature, wherein said shape memory material comprises an embedded thermal energy generation means;
   b) processing said shape memory material into a memorized shape; and
   c) deforming said shape memory material from said memorized shape into a desired mold shape.

2. The method of claim 1 wherein said thermal energy generation means comprises an electrical conductor.

3. The method of claim 1 wherein said thermal energy generation means comprises thermally conductive fibers.

4. The method of claim 1 wherein the shape memory material is processed into a memorized shape that is in the form of a flat sheet.

5. The method of claim 1 wherein the shape memory material is processed into a memorized shape that is an inverted image of the desired mold shape.

6. The method of claim 1 wherein the shape memory material is transparent.

7. The method of claim 1 wherein said shape memory material is a shape memory polymer.

8. A method of making a mold for use in manufacturing castable composite parts, said parts being cast with resins that solidify within said mold upon application of a curing temperature, said method comprising the steps:
   a) providing a mold material of shape memory polymer having a glass transition temperature which exceeds the curing temperature of the castable composite part to be formed in the mold;
   b) processing said shape memory material into a memorized shape; and
   c) deforming said shape memory material from said memorized shape into a desired mold shape, wherein said desired mold shape is different from said memorized shape such that the mold expels the cast composite part therefrom when the shape memory polymer is caused to revert to its memorized shape.

9. The method of claim 8 further comprising embedding a thermal energy generation means in the shape memory polymer.

10. The method of claim 9 wherein said thermal energy generation means comprises thermally conductive fibers.

11. The method of claim 9 wherein the shaped memory material is processed into a memorized shape that is in the form of a flat sheet.

12. The method of claim 9 wherein the shaped memory material is processed into a memorized shape that is an inverted image of the desired mold shape.

13. The method of claim 9 wherein the shaped memory material is transparent.

14. The method of claim 9 wherein said thermal energy generation means comprises an electrical conductor.

15. The method of claim 8 wherein said processing of said shape memory material is by die casting.

16. The method of claim 8 wherein said processing of shape memory material is by extrusion.

17. The method of claim 8 wherein said processing of said shape memory material is by molding and annealing.

18. The method of claim 8 wherein said deforming of said shape memory material is by draping.

19. The method of claim 8 wherein said deforming of said shape memory material is by vacuum forming.

20. The method of claim 8 wherein said deforming of said shape memory material is by computer aided mechanical technology.

21. The method of claim 8 wherein said deforming of said shape memory material is by stamping.

22. The method of claim 21 wherein said stamping of said shape memory material is performed with said shape memory material below said glass transition temperature.

23. The method of claim 21 wherein said stamping of said shape memory material is performed with said shape memory material above said glass transition temperature.

24. The method of claim 8 wherein said shape memory material is a shape memory polymer.

* * * * *